US010906185B2

(12) United States Patent
Deyle et al.

(10) Patent No.: US 10,906,185 B2
(45) Date of Patent: Feb. 2, 2021

(54) MOBILE ROBOT WITH ARM FOR ACCESS POINT SECURITY CHECKS

(71) Applicant: Cobalt Robotics Inc., San Mateo, CA (US)

(72) Inventors: Travis J. Deyle, San Carlos, CA (US); Erik Schluntz, Mountain View, CA (US); Michael Ferguson, Concord, NH (US); Peregrine Badger, San Mateo, CA (US)

(73) Assignee: Cobalt Robotics Inc., San Mateo, CA (US)

( * ) Notice: Subject to any disclaimer, the term of this patent is extended or adjusted under 35 U.S.C. 154(b) by 0 days.

(21) Appl. No.: 16/391,308

(22) Filed: Apr. 23, 2019

(65) Prior Publication Data

US 2019/0248014 A1    Aug. 15, 2019

Related U.S. Application Data

(63) Continuation-in-part of application No. 15/426,048, filed on Feb. 6, 2017, now Pat. No. 10,414,052, which
(Continued)

(51) Int. Cl.
*B25J 9/16*        (2006.01)
*B25J 13/00*       (2006.01)
(Continued)

(52) U.S. Cl.
CPC ........... *B25J 9/1694* (2013.01); *B25J 9/0003* (2013.01); *B25J 9/1697* (2013.01); *B25J 13/006* (2013.01);
(Continued)

(58) Field of Classification Search
CPC ...... B25J 13/006; B25J 9/1694; B25J 9/1697; G05D 1/0212; G05D 1/0094; G05D 2201/0209
See application file for complete search history.

(56) References Cited

U.S. PATENT DOCUMENTS

| 3,088,157 A | 5/1963 | Aguilar |
| 8,009,013 B1 | 8/2011 | Hirschfeld et al. |

(Continued)

FOREIGN PATENT DOCUMENTS

| CN | 1593859 A | 3/2005 |
| CN | 102253673 A | 11/2011 |

(Continued)

OTHER PUBLICATIONS

Jain et al. "Behaviors for Robust Door Opening and Doorway Traversal with a Force-Sensing Mobile Manipulator", Robotics: Science & Systems 2008 Manipulation Workshop—Intelligence in Human Environments, Jun. 28, 2008, Zurich (Year: 2008).*
(Continued)

*Primary Examiner* — Rachid Bendidi
(74) *Attorney, Agent, or Firm* — Fenwick & West LLP

(57) ABSTRACT

A mobile robot is configured for operation in a commercial or industrial setting, such as an office building or retail store. The mobile robot can have a motorized base and a robot body on the motorized base, the robot body including a rotatable ring that rotates horizontally around the robot body. A mechanical arm that can contract and extend relative to the robot body is coupled to the rotatable ring and performs a plurality of actions. A controller of the mobile robot provides instructions to the rotatable ring and the mechanical arm and can cause the mechanical arm to open a door, take an elevator to move to a different floor, and test whether a door is locked properly.

17 Claims, 20 Drawing Sheets

Related U.S. Application Data is a continuation-in-part of application No. 16/059,035, filed on Aug. 9, 2018.

(51) Int. Cl.
 *G05D 1/00* (2006.01)
 *G05D 1/02* (2020.01)
 *B25J 9/00* (2006.01)

(52) U.S. Cl.
 CPC ......... *G05D 1/0094* (2013.01); *G05D 1/0212* (2013.01); *G05D 2201/0209* (2013.01)

(56) References Cited

U.S. PATENT DOCUMENTS

| | | | |
|---|---|---|---|
| 8,255,092 | B2 | 8/2012 | Phillips et al. |
| 8,428,777 | B1 | 4/2013 | Poursohi et al. |
| 9,031,697 | B2 | 5/2015 | Huang et al. |
| 9,069,356 | B2 | 6/2015 | Papaefstathiou et al. |
| 9,216,509 | B2 | 12/2015 | Renkis |
| 9,323,250 | B2 | 4/2016 | Wang et al. |
| 9,329,597 | B2 | 5/2016 | Stoschek et al. |
| 9,436,926 | B2 | 9/2016 | Cousins et al. |
| 9,535,421 | B1 | 1/2017 | Canoso et al. |
| 9,792,434 | B1 | 10/2017 | Li et al. |
| 9,830,798 | B2 | 11/2017 | Poursohi et al. |
| 9,844,879 | B1 | 12/2017 | Cousins et al. |
| 9,939,814 | B1 | 4/2018 | Bauer et al. |
| 9,987,745 | B1* | 6/2018 | Berard ................ B25J 9/1661 |
| 10,012,996 | B1 | 7/2018 | Canoso et al. |
| 2001/0037163 | A1 | 11/2001 | Allard |
| 2005/0216126 | A1 | 9/2005 | Koselka et al. |
| 2006/0112034 | A1 | 5/2006 | Okamoto et al. |
| 2007/0192910 | A1 | 8/2007 | Vu et al. |
| 2008/0302200 | A1* | 12/2008 | Tobey ..................... B25J 5/007 74/490.02 |
| 2010/0268383 | A1 | 10/2010 | Wang et al. |
| 2011/0035054 | A1 | 2/2011 | Gal et al. |
| 2011/0148633 | A1 | 6/2011 | Kohlenberg et al. |
| 2012/0083923 | A1 | 4/2012 | Matsumoto et al. |
| 2012/0197464 | A1 | 8/2012 | Wang et al. |
| 2012/0215383 | A1 | 8/2012 | Yoon et al. |
| 2012/0313779 | A1 | 12/2012 | Papaefstathiou et al. |
| 2013/0014219 | A1 | 1/2013 | Kraus et al. |
| 2013/0034295 | A1 | 2/2013 | Tsuchinaga et al. |
| 2013/0270017 | A1 | 10/2013 | Wolf et al. |
| 2014/0207282 | A1 | 7/2014 | Angle et al. |
| 2014/0266669 | A1 | 9/2014 | Fadell et al. |
| 2014/0366676 | A1 | 12/2014 | Kim et al. |
| 2015/0170509 | A1 | 6/2015 | Artes et al. |
| 2015/0205297 | A1* | 7/2015 | Stevens ................ G01S 1/68 701/2 |
| 2015/0205298 | A1 | 7/2015 | Stoschek et al. |
| 2015/0290808 | A1 | 10/2015 | Renkis |
| 2015/0379358 | A1 | 12/2015 | Renkis |
| 2016/0129592 | A1 | 5/2016 | Saboo et al. |
| 2016/0188977 | A1* | 6/2016 | Kearns ............... G06K 9/00664 348/113 |
| 2016/0334802 | A1 | 11/2016 | Sogen |
| 2016/0339587 | A1 | 11/2016 | Rublee |
| 2017/0136631 | A1 | 5/2017 | Li et al. |
| 2017/0201617 | A1 | 7/2017 | So et al. |
| 2017/0255840 | A1 | 9/2017 | Jean et al. |
| 2017/0364074 | A1 | 12/2017 | Lau et al. |
| 2018/0103579 | A1 | 4/2018 | Grufman et al. |
| 2018/0311820 | A1 | 11/2018 | Fritz et al. |

FOREIGN PATENT DOCUMENTS

| | | |
|---|---|---|
| CN | 103294061 A | 9/2013 |
| CN | 207191210 U* | 4/2018 |
| FR | 2987689 A1 | 9/2013 |
| KR | 2015-0033443 A | 4/2015 |
| WO | WO 2017/139443 A9 | 8/2017 |

OTHER PUBLICATIONS

United States Office Action, U.S. Appl. No. 15/426,048, dated Apr. 1, 2019, 17 pages.
United States Office Action, U.S. Appl. No. 15/426,048, dated Dec. 5, 2018, 16 pages.
United States Office Action, U.S. Appl. No. 15/426,048, dated May 30, 2018, 14 pages.
International Search Report and Written Opinion, PCT Patent Application No. PCT/US2019/044098, dated Dec. 3, 2019, 19 pages.
United States Office Action, U.S. Appl. No. 16/391,306, dated Dec. 12, 2019, 20 pages.
PCT Invitation to Pay Additional Fees, PCT Application No. PCT/US19/44098, dated Oct. 10, 2019, 2 pages.

* cited by examiner

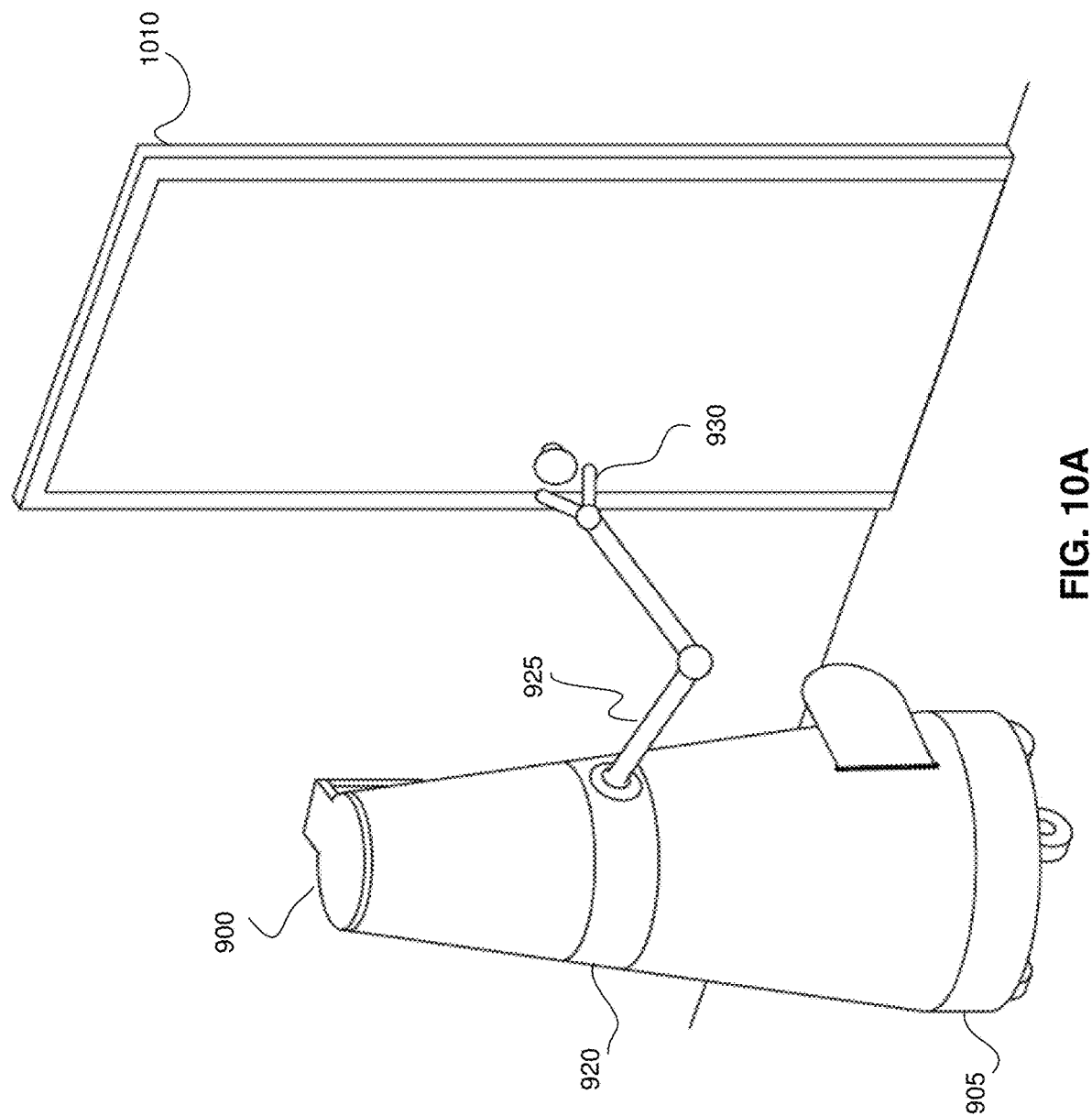

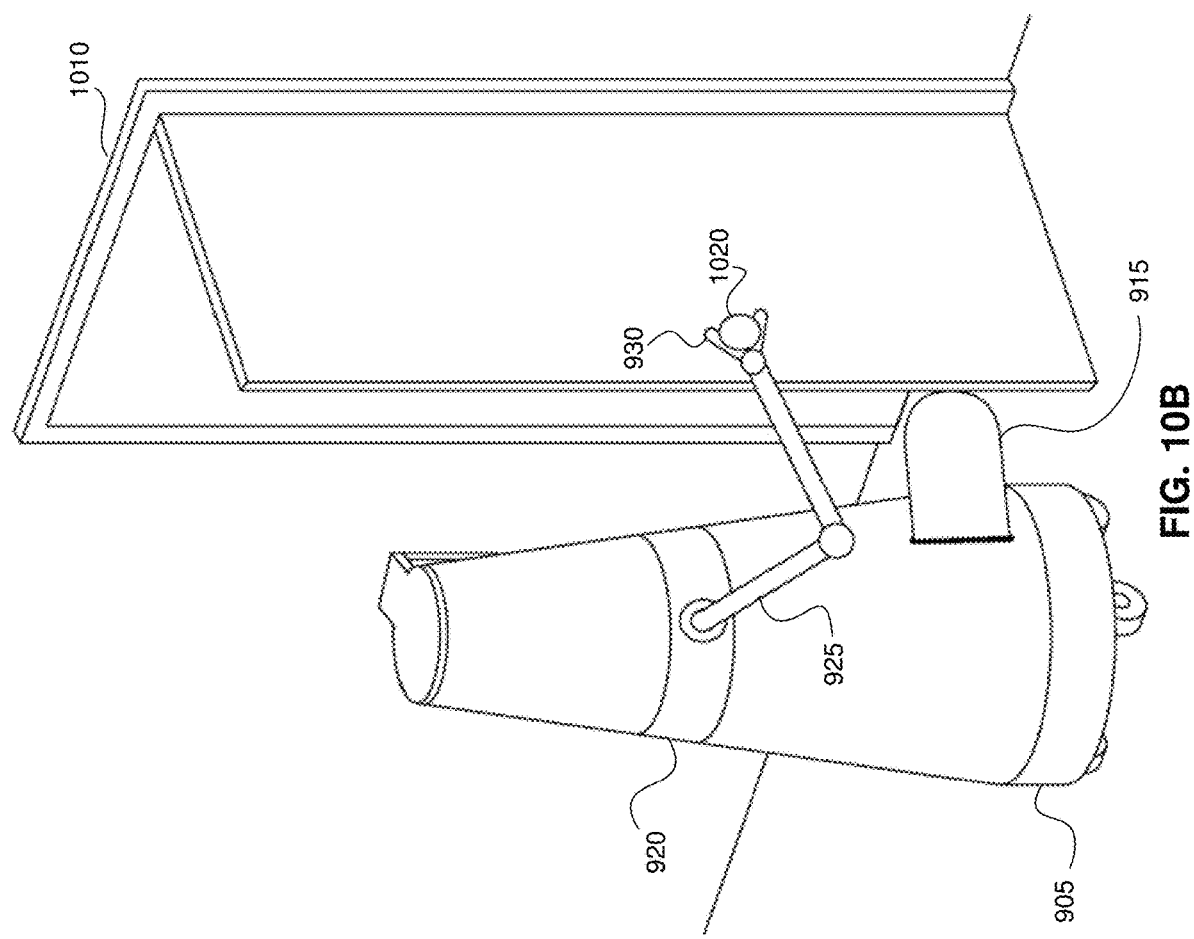

MOBILE ROBOT WITH ARM FOR ACCESS POINT SECURITY CHECKS

CROSS-REFERENCE TO RELATED APPLICATIONS

This application is a continuation-in-part of U.S. application Ser. No. 15/426,048, filed Feb. 6, 2017, and U.S. application Ser. No. 16/059,035, filed Aug. 9, 2018, both of which are incorporated by reference in their entirety.

BACKGROUND

This application relates generally to robots, and in particular to robots configured for operation in commercial and industrial settings.

Robots are increasingly prevalent in society, particularly in entertainment and manufacturing contexts. However, the adoption of robots in these contexts has outpaced settings where frequent robot/human interactions are required. Examples of such settings include retail environments, security environments, and the like. The abilities of robots, for instance, the ability to communicate with building and object infrastructure, creates an unaddressed demand for the implementation of robots in commercial and industrial settings.

SUMMARY

A mobile robot ("robot" hereinafter) configured for operation in commercial and industrial settings is described herein. The robot can perform a number of functions and operations in a variety of categories, including but not limited to security operations, cleaning operations, infrastructure or maintenance operations, navigation or mapping operations, inventory management operations, and robot/human interaction operations.

In some embodiments, the robot can include a motorized base and a robot body on the motorized base. The robot can move from one location to another via the motorized base within a building (e.g., an office building, a store, a campus) and outside the building (e.g., a parking lot). The robot body can be coupled to a mechanical arm that can contract, extend, and rotate relative to the robot body, which increases the degrees of freedom in the motion of the robot. The mechanical arm can be coupled to a rotatable ring that encircles the robotic arm and rotates horizontally about the robot body. The mechanical arm is coupled to a position on the rotatable ring, and to move the mechanical arm to a desired position relative to the robot body, the rotatable ring is rotated until the mechanical arm is at the desired position. The mechanical arm can also include a mechanical hand that can grab and release objects. The robot also includes a plurality of sensors that collects data about a surrounding environment of the robot, and based on the collected data, a controller of the robot may rotate the rotatable ring by a distance about the robot body such that the robot arm is at a desired position for performing an action. The robot can have one or more controllers that generate and execute motion plans of components of the robot. For example, the one or more controllers can control movement of the rotatable ring, the mechanical arm, as well as other components.

In some embodiments, the robot can open a door using the rotatable ring and the mechanical arm coupled to the rotatable ring. The rotatable ring and the mechanical arm allows the robot to be ambidextrous. A controller of the robot can identify a door to be opened based on information stored in a central system and/or information collected by sensors and cameras on the robot. The door can be a left-opening door or a right-opening door. The controller causes the motorized base to move to a location close to the door such that the robot may reach a door handle or knob of the door with the mechanical arm. The controller of the robot identifies a location of a door handle or knob on the door with respect to the robot such that the mechanical arm may interact with the door handle or knob. The controller generates a motion plan that describes a series of motions to be performed by the mechanical arm to open the door. The motion plan can specify a position, orientation, and force of the mechanical arm for each of one or more movements of the mechanical arm. The controller determines a first force to apply to the handle or knob to unlock the door. Once the door is unlocked, the controller causes the mechanical arm to apply a second force to cause the door to open and rotate on its hinges by at least enough displacement to allow the robot to pass through the door.

In some embodiments, the robot can take an elevator to move from one floor to another floor. The controller of the robot can identify a location of the elevator based on maps of a building, semantic maps, sensors, and such. After identifying the location of the elevator, the robot can move to a location within a threshold distance from the elevator that is within reach of buttons that are outside of the elevator. The controller causes the robot to press a button outside of the elevator to call the elevator by causing the rotatable ring to rotate and orienting the mechanical arm of the robot in position for pressing the button. After pressing the button, the controller determines when elevator doors are open and determines a target location within the elevator that has enough space for the robot. When the target location is determined, the controller causes the motorized base to move to the target location within the elevator. Once the robot is in the elevator, the controller causes the mechanical arm to press a button inside the elevator by rotating the rotatable ring to put the mechanical arm in position for pressing the button of a target floor. The controller determines when the elevator doors are open and causes the motorized base to exit the elevator.

In some embodiments, the robot can check that a door is properly locked, for instance as part of a security check. The controller of the robot may identify a door to be tested and cause the motorized base to move to a location within a threshold distance of the identified door. The controller identifies a location of a door handle or knob of the door and rotates the rotatable ring such that the mechanical arm may apply a force to the door handle or knob. The force can be a threshold amount of force that is associated with a lock state of the handle. After applying the threshold amount of force to the lock state, if the door does not open, the controller determines that the door is in locked state. Likewise, if the door does open, the controller determines that the door is improperly in an unlocked state, and can either configure the robot to lock the door or can alert security or building personnel of the unlocked door for manual locking.

BRIEF DESCRIPTION OF THE DRAWINGS

FIGS. 10A, 10B, 10C, and 10D illustrate a process of a mobile robot opening a door, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1C:
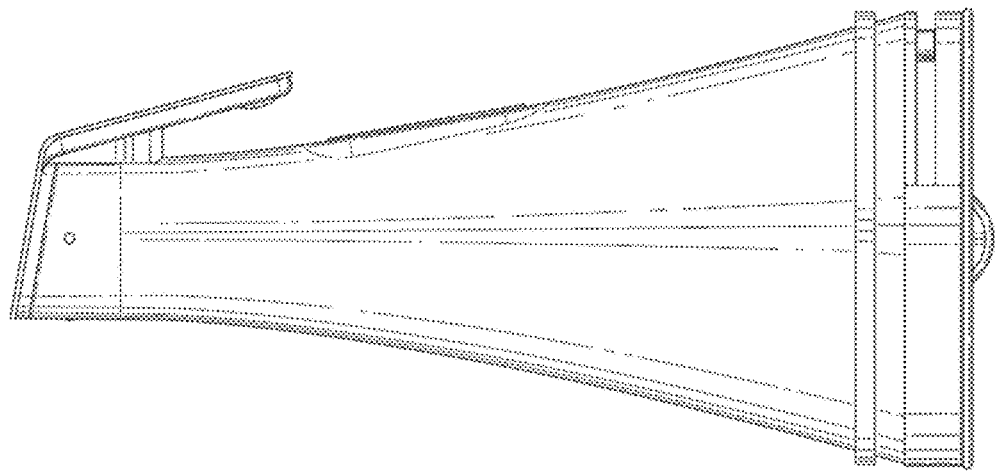
FIGS. 1A, 1B, and 1C illustrate various views of a mobile robot, according to one embodiment.
Figure 1B:
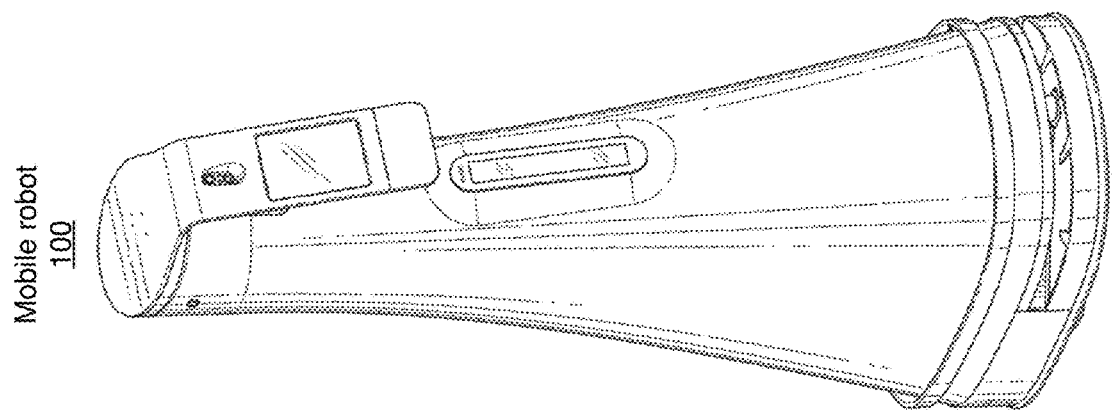
Figure 1A:
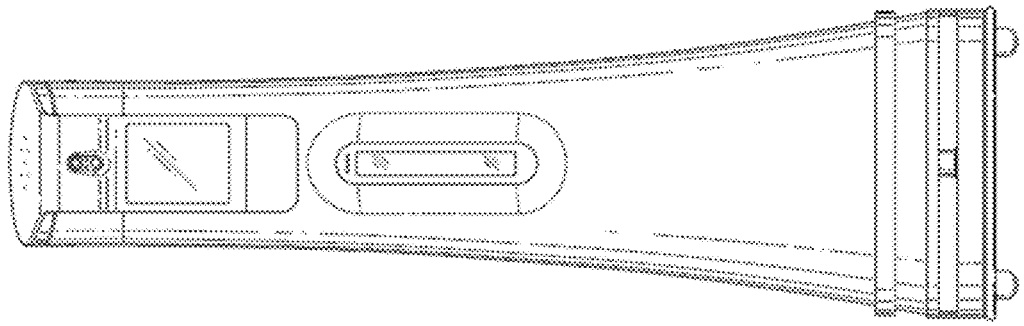

FIGS. 1A, 1B, and 1C illustrate various views of a mobile robot, according to one embodiment. The mobile robot 100 (or simply "robot" hereinafter) can navigate and move around an environment in which the robot is located, for instance by moving forward, backwards, sideways, and by turning or rotating up to 360 degrees within a plane defined by a surface on which the robot is located. In some embodiments, the robot can be deployed within a building, for instance on one or more floors or portions of floors of a building, can be deployed outside (for instance, in a parking lot), or can be deployed any other suitable location.

The robot 100 can include exterior fabric panels. The fabric panels can be removably or fixedly coupled around a housing body of the robot. In some embodiments, all or a portion of the robot includes a hard exterior surface, such as a hard plastic or metal exterior. The robot can also include a plurality of sensors and other components enclosed within the housing body, described below in greater detail. A portion of the sensors can be located within the body of the robot, for instance behind or underneath fabric panels such that the sensors can receive signals that propagate through the fabric panels. The structure, components, and functionality of the robot are described below in greater detail. It should be noted that in other embodiments, the robot can include different form factors, structures, components, and functionalities than those described herein.

Figure 2:
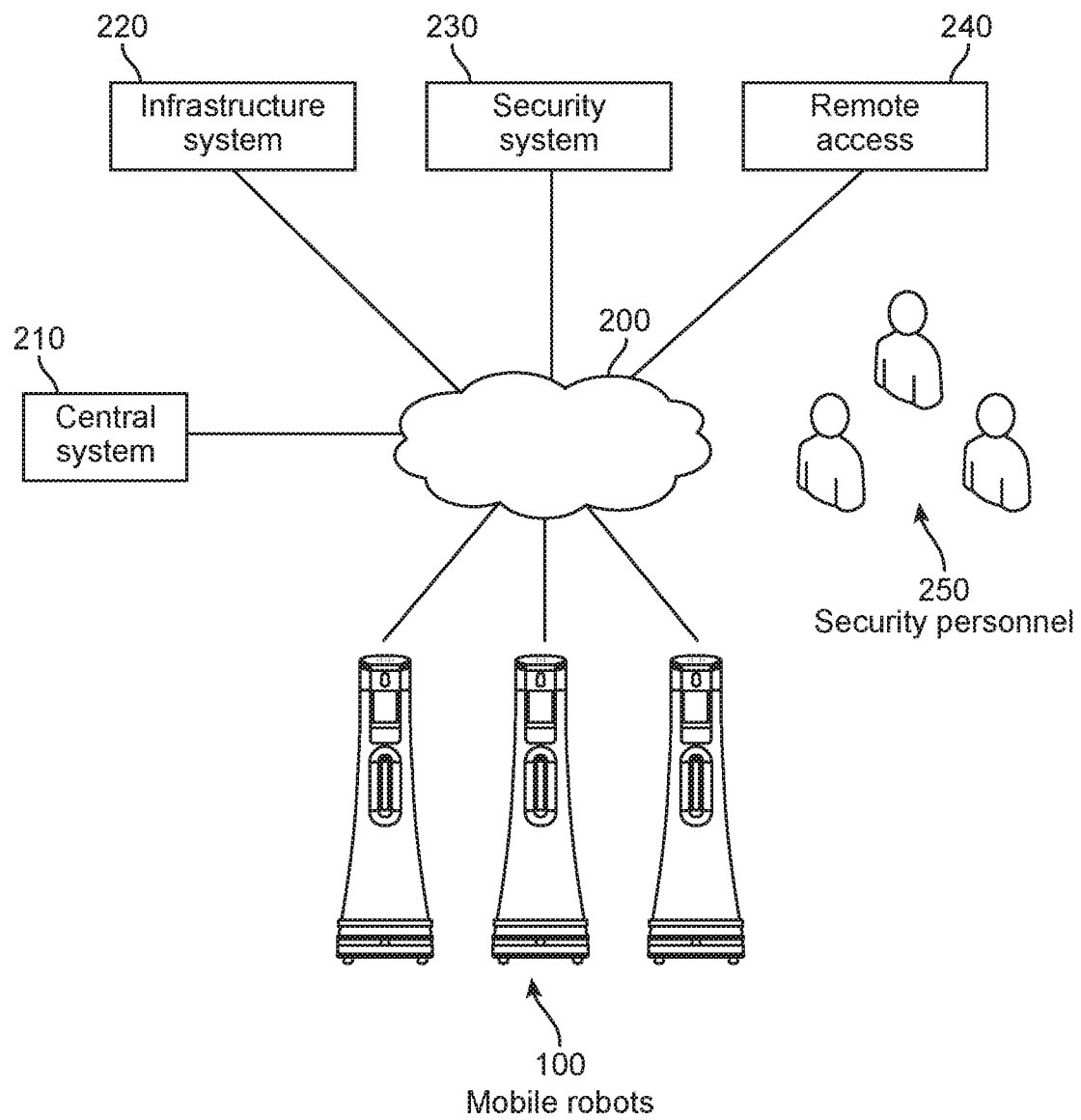
FIG. 2 is a high level block diagram illustrating a mobile robot environment, according to one embodiment.

FIG. 2 is a high level block diagram illustrating a mobile robot environment, according to one embodiment. The environment of FIG. 2 includes one or more robots 100, a central system 210, various infrastructure systems 220, various security systems 230, a remote access interface 240, and one or more security personnel 250, communicatively connected through the network 200. It should be noted that in other embodiments, the environment of FIG. 2 can include fewer, additional, or different components than those described herein. Each of the components of FIG. 2 can include one or more computer systems, custom hardware or electronic systems, or any other system configured to enable the components of FIG. 2 to perform the functions described herein.

The environment of FIG. 2 can include any number of robots 100, for instance 1, 2, 10, or more. For example, the environment of FIG. 2 can include one or more buildings, and can include one or more robots per building (for instance, one robot per building floor). One or more security personnel 250 (for instance, one or more robot operators) can control or monitor the robots, and can adjust a robot deployment as needed (for instance, by allocating additional robots to a building floor on which a security violation is detected). It should be noted that as used herein, "security personnel" can refer to remote or on-site robot operators, remote or on-site security system operators (e.g., individuals monitoring security cameras), on-site security guards, police personnel, building managers, or any other suitable individuals.

The central system 210 can be a central server or other computing system configured to provide instructions to the robots, to receive information from the robots, to access data corresponding to the robots or the other components of FIG. 2, to display the received information or accessed data (for instance, to a user of the central system), to perform one or more other functions as described herein, and to provide a communicative interface between, via the network 200, the robots and other components of FIG. 2. The central system is described in greater detail below.

The infrastructure system 220 (or infrastructure systems) can include one or more components of a building or environment in which the robots 100 are located. In some embodiments, the infrastructure systems are communicatively coupled to the network 200 or are otherwise capable of communication with the robots. Examples of system infrastructure systems include smart doors and windows, elevators, routers and other network components, power systems, smart lights, smart fire alarms and other sensors, connected furnace or air conditioning systems, "Internet of things" or IoT systems, and the like. In some embodiments, the infrastructure systems aren't capable of communication with via the network 200 or otherwise, for instance disconnected doors and windows, disconnected elevators, thermal vents, and the like. The infrastructure systems of FIG. 2 are described in greater detail below.

The security system 230 (or security systems) can also include one or more security components of a building or environment in which the robots 100 are located. Examples of security systems can include camera systems, access gates, door or window locks, audio detectors, motion detectors, security interfaces or displays, and the like. The security systems can be configured to communicate with the network 200 and/or robots, or may be disconnected systems (alarms that do not communicate and that must be manually reset). The security systems of FIG. 2 are described in greater detail below.

The remote access interface 240 is a computing system, such as a computer, a server, a phone or other mobile device, or any other system that enables a user to remotely access the network 200, and via the network, to interact with one or more other components of the environment of FIG. 2. For instance, a user can remotely access information via the remote access interface provided by the robots 100 to the central system 210, such as a video feed captured by one or more robots. Likewise, a user can remotely provide instructions to the infrastructure systems 220, security systems 230, and/or the robots via the remote access interface, for instance to investigate an unauthorized access of a portion of a building, to lock doors within the vicinity of an alarm, or to scan RFID tags for products within a portion of a store. The remote access interface can include a display for displaying information related to one or more components of FIG. 2, an input mechanism for receiving interactions from a user of the remote access interface, and a communicate interface enabling the remote access interface to communicate via the network 200. It should be noted that in some embodiments, the remote access interface can be implemented within hardware located remotely from the central system, the robots, or the other components of FIG. 2, for instance within a different building or on a different floor from the other components of FIG. 2.

The security personnel 250 can include guards located at guard stations, patrolling guards, access gate guards, or remote security personnel. For instance, the security personnel can include one or more robot operators configured to monitor and control the actions or movements of the robots 100. Robot operators can interact with robots via the central system 210 or via the remote access interface 240, and direct other security personnel as needed (for instance, by instructing security personnel to investigation a security violation detected by the robots).

The network 200 may be the Internet, a local area network (such as a building-wide or site-wide network), a wireless network, a mesh network, or any other network or combination thereof that allows communication between the components of FIG. 2. The connecting network 200 may use standard communications technologies and/or protocols, such as WiFi, Bluetooth, LTE, cellular networks, and the like.

Figure 3:
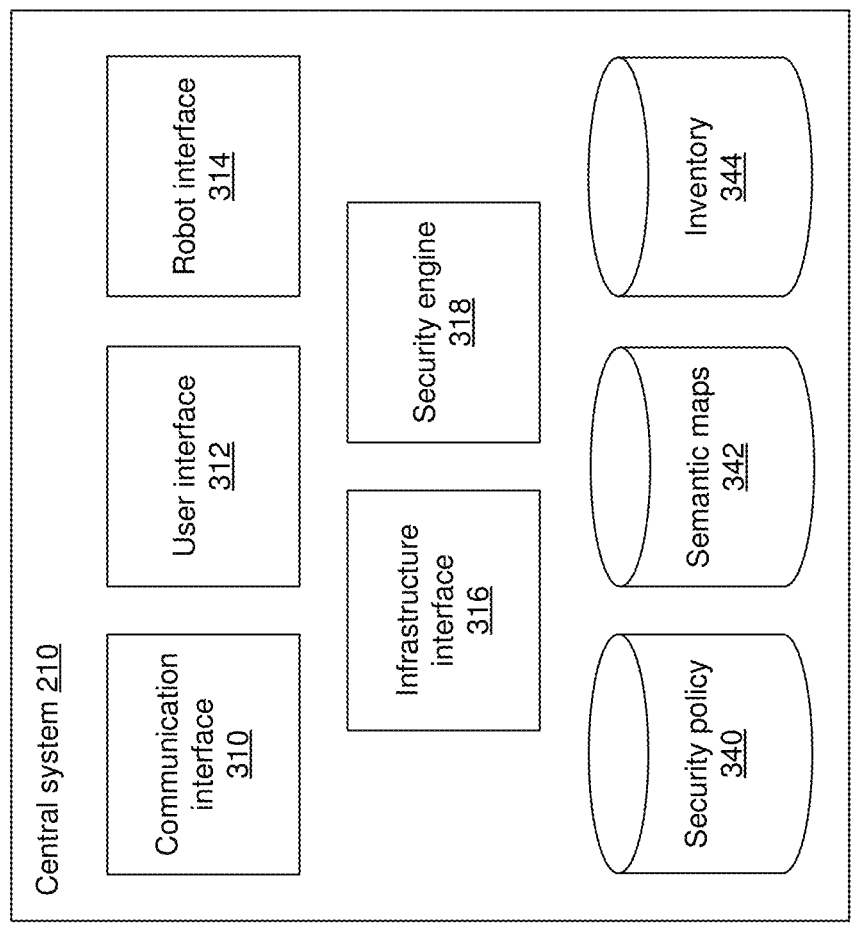
FIG. 3 is a block diagram of the central system of FIG. 2, according to one embodiment.

FIG. 3 is a block diagram of the central system of FIG. 2, according to one embodiment. The central system 210 of FIG. 2 includes a communication interface 310, a user interface 312, a robot interface 314, an infrastructure interface 316, a security engine 318, a security policy storage module 340, a semantic maps storage module 342, and an inventory storage module 344. In other embodiments, the central system includes fewer, additional, or different components than those described herein.

The communication interface 310 is configured to provide a communicative interface between the components of the central system 210 and the other components of FIG. 2. For instance, the communication interface enables the transfer of data between robots 100 and the central system. The communication interface can provide instructions or data to one or more infrastructure systems, security systems, or robots, for instance in response to a user command or during the performance of one or more security operations.

The user interface 312 is configured to enable a user of the central system 210 (such as a security personnel 250 or a robot operator) to interact with the central system. For instance, the user interface can include a graphical user interface (or GUI) displayed on hardware corresponding to the central system. The GUI can include video streams from one or more security cameras; can include a location of one or more robots 100 or objects overlaid on a map of a building, floor, or site; can include data corresponding to one or more infrastructure systems; and the like. The user interface can enable a user of the central system to provide one or more instructions or commands or otherwise interact with one or more components of the environment of FIG. 2, to configure or otherwise interact with one or more components of the central system, and to access and view data associated with one or more components of the environment of FIG. 2. The user interface, and GUIs associated with the user interface, are described below in greater detail.

The robot interface 314 is configured to enable the central system 210 (or a user of the central system) to interact with one or more robots 100. For instance, the robot interface can receive data from the one or more robots 100 via the communication interface 310 for display on the user interface 312. The robot interface can also provide data to the one or more robots via the communication interface, for instance in response to a command received from a user via the user interface. The robot interface can format data provided to and received from the robots into a format compliant with the robots and central system, respectively. The data received from, the instructions provided to, and the functions of the robots are described below in greater detail.

The infrastructure interface 316 is configured to enable the central system 210 (or a user of the central system) to interact with one or more infrastructure systems 220 via the communication interface 310. For instance, the infrastructure interface can lock one or more doors within a building, can cut power to a portion of a floor, and store received inventory information. Likewise, the security engine 318 is configured to enable the central system or a user of the central system to interact with one or more security systems 230 via the communication interface. For instance, the security engine can direct video cameras to a location within a building and receive footage from the cameras, can receive badge data from badge readers, and direct security personnel 250 to a building portion where motion was detected. The security engine can also implement one or more security policies or security operations, either independently from or at the direction of a user of the central system. Security policies and operations are described below in greater detail.

The security policy storage module 340 stores one or more security policies for implementation by the central system 210. A security policy can identify:

- portions of a building or floor, individuals who are authorized to access those portions, permitted times of access, and requisite security credentials
- times that particular doors, windows, and access gates are to be locked and unlocked
- routes or paths through buildings or floors for one or more robots 100 to patrol and corresponding times for patrol
- times of activation for security cameras, audio detectors, and motion detectors
- violations of security policies and the thresholds and conditions that trigger a security policy violation
- operations to be performed (by robots, security personnel 250, or infrastructure or security systems) in the event of a detected violation of a security policy
- communications and data from the components of FIG. 2 to be presented to a user of the central system The semantic maps storage module 342 can store one or more semantic maps, for instance semantic maps generated by robots 100. The user interface 312 can access and display one or more semantic maps to a user of the central system 210, and one or more components of the central system can update the displayed semantic map for subsequent storage in the semantic maps storage module in response to receiving information from one or more robots, security personnel 250, or any other component of FIG. 2. For instance, if a semantic map indicates that a window is open, and a robot patrolling within proximity of the window detects that the window has subsequently been closed, the semantic map can be updated (for instance, by the infrastructure interface 316) to reflect the closed status of the window and the updated semantic map can be stored in the semantic maps storage module.

The inventory storage module 344 stores information associated with objects within a building, within a floor, within a room or store, and the like. For instance, the inventory storage module can include a database detailing types of inventory, stock levels associated with each inventory type, and a location of each inventory object within a building. The inventory storage module can be updated, for instance, in response to receiving information from a robot 100 indicating that the location of one or more objects within a store has changed, that a missing object has been found, or that objects have been misplaced or lost. It should be noted that the inventory module can store locations, numbers, and types of objects in addition to retail objects or stock, for instance lab equipment, books or other reference materials, and the like. The inventory storage module can additionally store a status for objects (for instance, "misplaced", "lost", "stolen", "broken", "operational", and the like).

Figure 4:
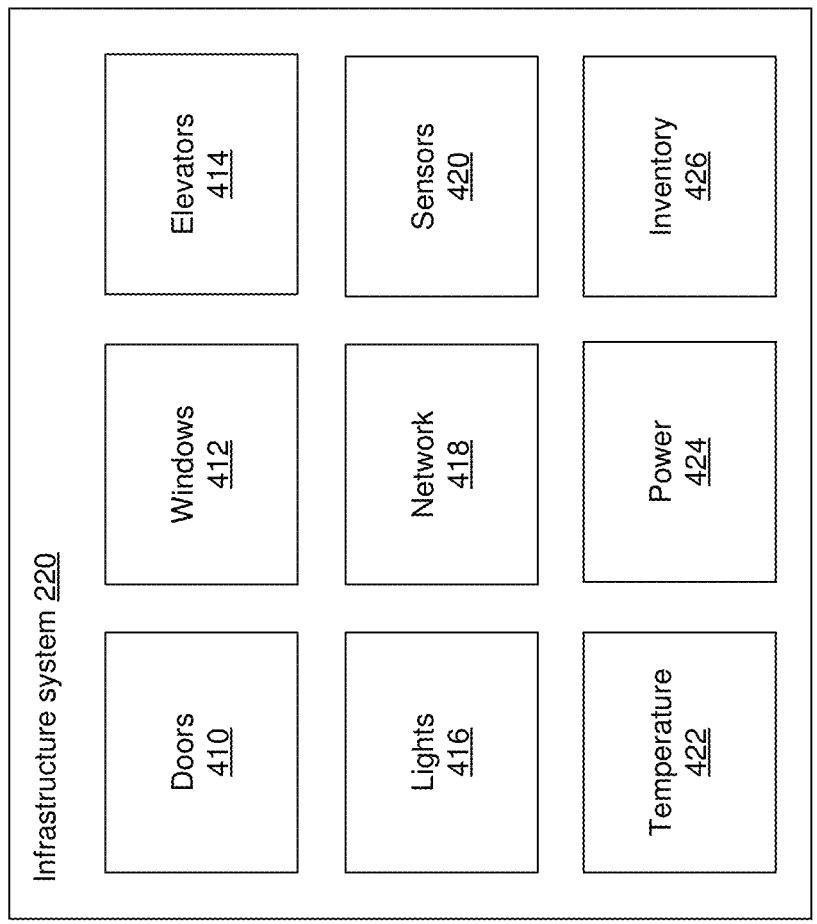
FIG. 4 is a block diagram of the infrastructure system of FIG. 2, according to one embodiment.

FIG. 4 is a block diagram of the infrastructure system of FIG. 2, according to one embodiment. In the embodiment of FIG. 4, the infrastructure system 220 includes doors 410, windows 412, elevators 414, lights 416, a network 418, sensors 420, temperature system 422, power system 424, and inventory 426. It should be noted that in other embodiments, the infrastructure system can include additional, fewer, or different components than those illustrated here.

The doors 410 and windows 412 of a building can be standard, disconnected, and/or non-electronic doors and windows. Alternatively, the doors and windows can be electronic and/or connected to other building infrastructure, for instance via the network 200. In embodiments where the doors and windows are electronic, a user of the central system 210, a robot 100, or a security personnel 250 can close, open, lock, or unlock the doors and windows, for instance manually (by the security personnel or robot) or electronically (by directly interfacing with the electronic subsystems of the doors and windows, or by providing instructions to the doors and windows via the network).

The elevators 414 can include one or more elevator within a building. The elevators can be connected to one or more components of the environment of FIG. 2, for instance the central system 210, or can be disconnected from the components of the environment. Instructions can be provided to the elevators, for instance by a user of the central system, a security personnel 250, or a robot 100 via the network 200 or directly to the elevator via an elevator interface, or manually, via a physical button press by the security personnel or the robot. Elevator instructions can include but are not limited to instructing the elevator to go to a particular floor (such as the floor a robot is on), stopping or disabling the elevator, opening and closing the elevator doors, controlling one or more elevator components (such as a speaker or display within the elevator), and the like.

The lights 416 can include various lighting systems within a building, for instance lights within particular rooms, on particular floors, or building-wide. The lights can be connected to other building systems, for instance via the network 200, and can be remotely activated or deactivated (for instance by a user of the central system 210 or a robot 100) or manually activated or deactivated (for instance by security personal 250 or a robot toggling a light switch or interface).

The network 418 can include networking infrastructure within a building or portion of a building, or across multiple buildings or locations. The network can include standard networking systems, such as routers, switches, severs, transceivers, and the like. The network can be connected to the other components of FIG. 2 via the network 200. A user (via the central system 210) or robot 100 can activate, deactivate, reset, or configure portions of the network. For instance, a robot, in response to determining that a portion of a wireless network within a building is currently down, can re-locate to a location within the building where the wireless network is active, and can instruct the central system to reset network systems corresponding to the non-functioning portion of the network.

The sensors 420 can include fire alarms, smoke detectors, carbon monoxide detects, gas or toxin detectors, thermometers, and the like. Information from the sensors can be provided to the central system 210, for instance directly via the network 200 or via a robot 100.

The temperature system 422 can include a furnace, air conditioning unit, fans or other air flow systems, thermal ductwork and corresponding control mechanisms (such as valves), and other systems associated with building temperature. Instructions can be provided to the temperature system, for instance from a user of the central system 210 via the network 200 or from a robot 100 (either via the network or by directly connecting to the temperature system). Example instructions include but are not limited to lowering the temperature or raising the temperature for an entire building or for building portions, increasing air flow, controlling one or more duct valves, and the like. Information can also be received from the temperature system by the central system, a robot, or by another component of FIG. 2. Examples of such information include power usage information, thermal information, system activity or capacity, and the like.

The power system 424 can include power infrastructure associated with a building. For instance, the power system can include one or more generators, feeds from an external power source, solar panels, breakers, power distribution units, power lines within and external to a building, meter boxes, robot recharge stations, vehicle recharge stations, and the like. In some embodiments, the power system is communicatively coupled to one or more components of FIG. 2, such as the central system 210, via the network 200. In such embodiments, a user of the central system, a security personnel 250, and/or a robot 100 can provide instructions to the power system via the network, for instance to deactivate a portion or all of a building's power infrastructure, to reset portions of the power infrastructure, to reset breakers, to turn generators on or off, and the like. The power system can also provide information to components of FIG. 2, for instance information detailing power usage within a building, within portions of a building, by components of a building, or information detailing power production or fuel usage by solar panels, generators, and the like.

The inventory 426 includes objects within a building, portion of a building, store, room, or other area. Examples of inventor include store inventory (objects for sale within the store), building equipment (such as lab equipment, computer equipment, and the like), sensitive objects (such as high security objects, expensive objects, and the like), vehicles, and the like. The inventory of a building can include tags or other receivers/transmitters (such as RFID tags) that can identify the object to which the tag is affixed to a system capable of reading the tag. Each object can include a unique identifier that is transmitted to a reader system, and, as described below, a robot 100 equipped with one or more RFID readers can identify and locate inventory within a building or building portion by navigating within a proximity to the corresponding object.

Figure 5:
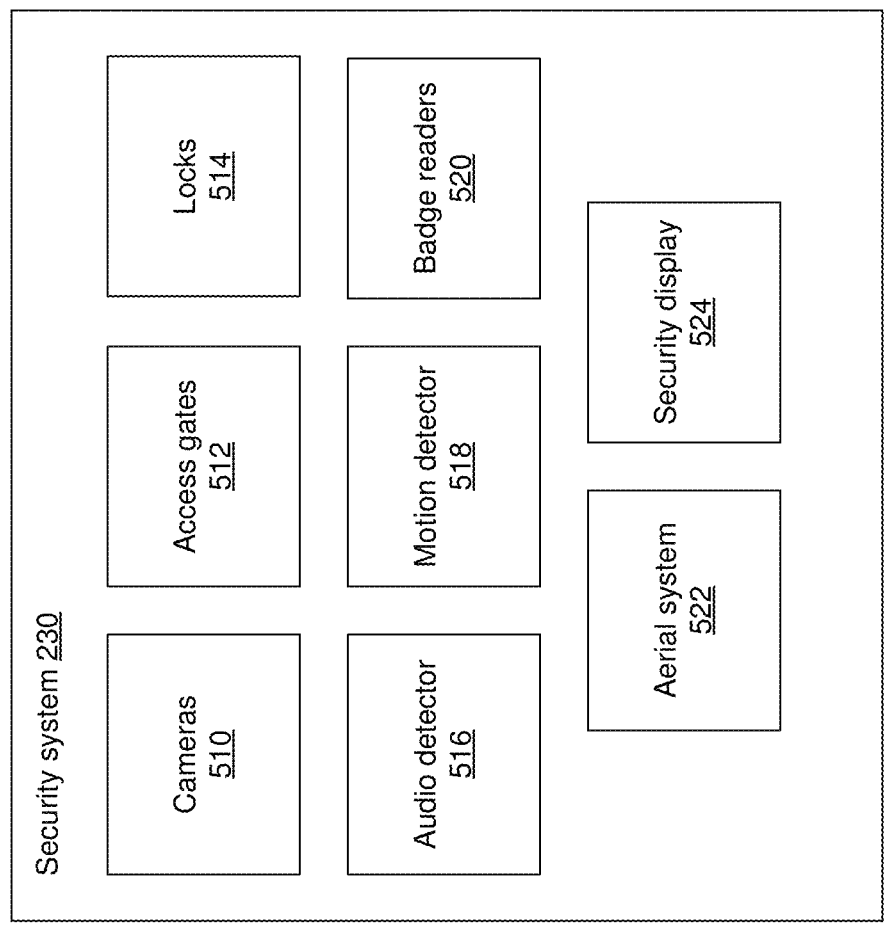
FIG. 5 is a block diagram of the security system of FIG. 2, according to one embodiment.

FIG. 5 is a block diagram of the security system of FIG. 2, according to one embodiment. In the embodiment of FIG. 5, the security system 230 includes cameras 510, access gates 512, locks 514, audio detectors 516, motion detectors 518, badge readers 520, aerial systems 522, and security displays 524. In other embodiments, the security system can include additional, fewer, or different components than illustrated herein. It should be noted that while many components of the security system can be disconnected from the other components of FIG. 2, the remainder of the description herein will be limited to embodiments in which the components of the security system can communicate via the network 200 (for instance, with the central system 210 or the robots 100).

The cameras 510 can be located within or external to a building, for instance within high-trafficked passages, high-security rooms or locations, locations corresponding to advantageous vantage points, and the like. In some embodiments, the field of view of a camera is fixed, while in other embodiments, the cameras can rotate, pan, tilt, or track objects or individuals, for instance in response to an instruction from a user of the central system 210 or in response to the detection of a suspicious noise or detected motion. The cameras can record video for storage and subsequent viewing or processing, or can stream the video to the central system or a robot 100. In some embodiments, the cameras can identify objects or individuals within video captured by the cameras and can provide this information to other components of FIG. 2, while in other embodiments, the central system identifies objects or individuals within video provided by the cameras, and provides this information to other components of the FIG. 2.

The access gates 512 can include physical barriers (such as barrier arms, walls, doors, and the like) configured to prevent or inhibit the movement of individuals, vehicles, or other objects. The access gates can allow individuals or vehicles to pass through in response to verifying that the individuals or vehicles are authorized to pass, for instance in response to verifying an individual's or vehicle's credentials or access permissions. In some embodiments, a robot 100, a user of the central system 210, or the central system itself can activate an access gate to allow or prevent individuals or vehicles from passing through, for instance in response to an instruction from the user or robot, or in response to a detected security violation or suspicious activity elsewhere within a vicinity of the access gate.

The locks 514 can be located within doors, windows, cabinets, cupboards, safes, or within any other suitable building infrastructure or object. The locks can be activated or deactivated by instructions from a robot 100, a user of the central system 210, or by the central system itself, for instance via the network 200. The locks can also be activated in response to the occurrence of a security violation or suspicious activity within a proximity of the locks.

The audio detector 516 is configured to detect audio signals, and to provide information describing the detected audio to one or more components of the environment of FIG. 2. Likewise, the motion detector 518 is configured to detect motion within a proximity of the motion detector, and to provide information describing the detect motion to one or more components of the environment of FIG. 2. For example, the audio detector can provide detected audio signals to the central system 210 for analysis, and the central system can determine if the detected audio signals are representative of a security violation. Likewise, the motion detector can provide detected motion signals to the central system, which can determine if the detected motion signals are representative of a security violation.

The badge readers 520 are configured to detect ID badges of individuals, to authenticate the identity, access credentials, or permissions of the individuals. The badge readers can provide information associated with the detected badges to components of the environment of FIG. 2, for instance via the network 200. The badge readers can include RFID readers, badge scanners, or any other suitable hardware. In some embodiments, badge readers are associated with doors, access gates, and the like such that an individual authenticated by the badge reader is granted access to the door, access gate, and the like.

The aerial systems 522 include one or more unmanned aerial vehicles (UAVs) configured to fly within a space (such as a building floor, parking lot, and the like). The aerial systems can receive instructions from components of FIG. 2, such as the central system 210 or a robot 100. The aerial systems can be instructed to patrol a particular area, for instance in response to a detected security violation or detected suspicious activity. The aerial systems can include cameras, RFID readers, or other sensors configured to capture information detected by the aerial systems and to provide the captured information to the central system, the robots, or other components of FIG. 2.

The security displays 524 are configured to display security information to individuals, such as a security status of a building or building portion, indications of security violations, and access credentials required to be in a particular location. The displayed security information can be received from the central system 210, from a robot 100, or from any other component of FIG. 2. The security displays can include hardware displays, and can be, for instance, tablet computers or interactive monitors. The security displays can be mounted within walls or other accessible locations. The security displays can receive inputs from individuals, for instance via a touch-screen interface of the security display or via any other suitable input mechanism. For instance, an individual can request access to a building portion, can request a door be unlocked, can request authentication, and the like via the security displays. The security displays can provide information describing the received inputs to the central security system or to any other component of FIG. 2, which in turn can perform a security action based on the provided information (for instance, unlocking a door or authenticating the individual).

Mobile Robot Housing

Figure 6:
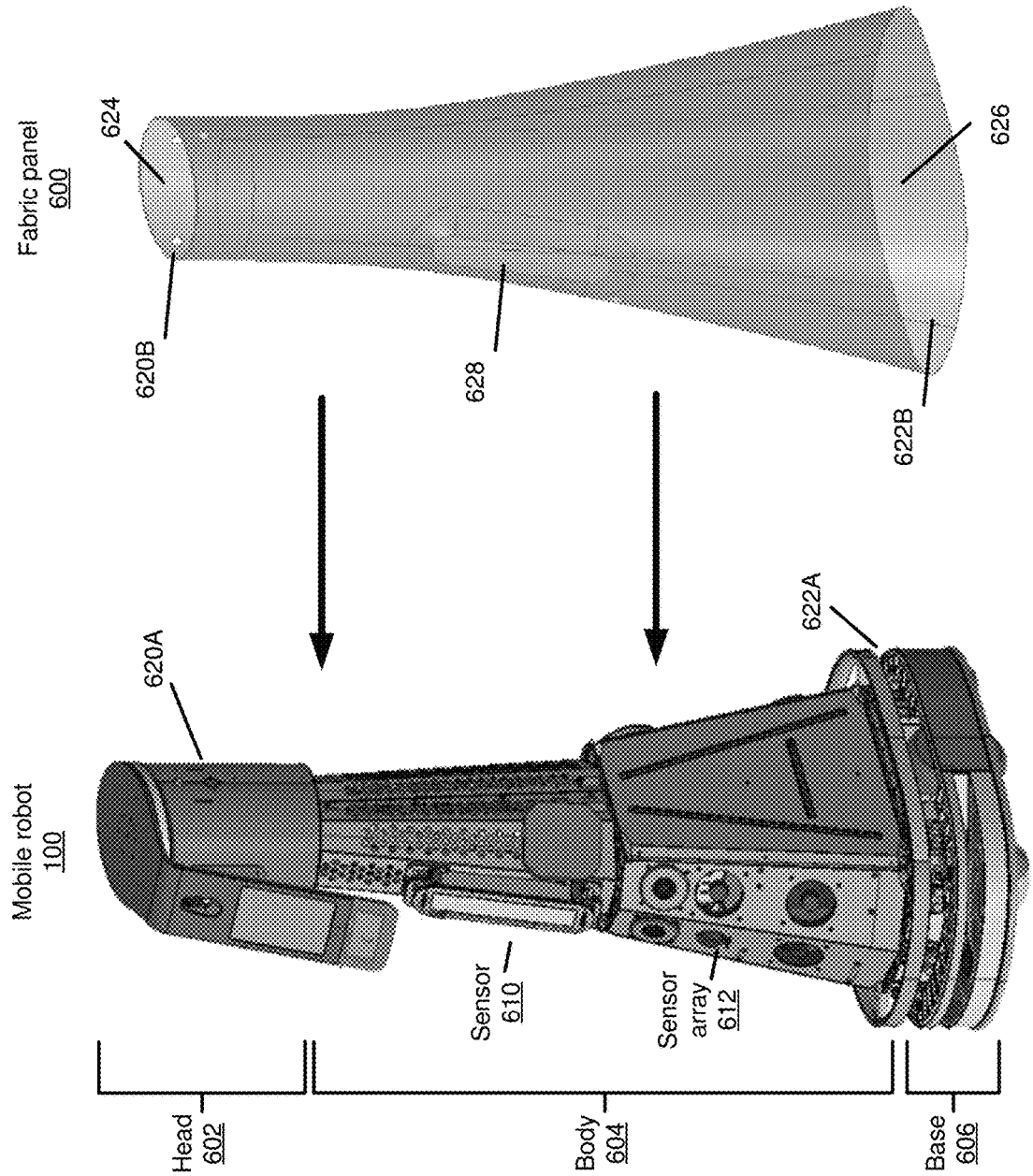
FIG. 6A illustrates a view of a mobile robot with a removed fabric exterior, according to one embodiment.
FIG. 6B illustrates a view of a removable fabric exterior for a mobile robot, according to one embodiment.

FIG. 6A illustrates a view of a mobile robot with a removed fabric exterior, according to one embodiment. The robot 100 of FIG. 6 includes a head portion 602, a body portion 604, and a base portion 606. The robot further includes a sensor 610 and a sensor array 612. As the fabric exterior is removed from the robot in the embodiment of FIG. 6A, the interior portion of the robot body is exposed. The robot also includes coupling means 620A located around the robot head and coupling means 622A located around the robot base.

FIG. 6B illustrates a view of a removable fabric exterior for a mobile robot, according to one embodiment. The fabric panel 600 includes coupling means 620B and 622B. The fabric panel also includes a top opening 624, a bottom opening 626, and a side opening 628. The circumference of the opening 624 corresponds to the circumference of the robot head, and the circumference of the opening 626 corresponds to the circumference of the robot base. Accordingly, the fabric panel is a tubular sock that can be stretched over and secured to the robot 100, thereby covering portions the interior of the robot. In some embodiments, the fabric panel is partially cone-shaped, with the diameter of the top opening being smaller than the diameter of the bottom opening, beneficially aiding in the placement of the fabric panel over the robot 100.

The fabric panel 600 can be made of any type of fabric material, for instance cotton, nylon, polyester, vinyl, velvet, or any other suitable or stretchable fabric material or blend/combination thereof. By stretching, the fabric panel of FIG. 6B can be placed over the head 602 of robot 100 (and any protrusions attached to the robot head) and any other components protruding from the robot body 604. Further, by stretching, contact made between the robot and other robots, individuals, or other objects can prevent damage to the fabric panel. It should be noted that in other embodiments, the fabric panel may include a material that does not significantly stretch.

The fabric panel 600 can include a fabric mesh material, allowing for the flow of air into and out of the robot 100, beneficially enabling the cooling of components of the robot interior by allowing for the transfer of heat out of the robot and through the fabric. Further, fabric may be semi-transparent or translucent, allowing for cameras, motion sensors, laser or LIDAR sensors, or other components within the robot to at least partially see through the fabric. Finally, the fabric may allow sound waves to pass through the fabric, allowing microphones or other audio components to capture sound waves passing through the fabric, and allowing speakers within the robot to transmit sound through the fabric.

The fabric panel 600 can couple to the robot 100 in a number of ways. In the embodiment of FIGS. 6A and 6B, coupling means 620B are configured to couple to coupling means 620A, and coupling means 622B are configured to couple to coupling means 622A. The coupling means 620B may be located around an inside perimeter of the top of the fabric panel, and the coupling means 622B may be located around an inside perimeter of the bottom of the fabric panel. Likewise, the coupling means 620A may be located around an outside perimeter of the robot head 602, and the coupling means 622A may be located around an outside perimeter of the robot base 606. In other embodiments, the coupling means of the fabric panel and the robot may be located in different locations on the fabric panel and the robot.

In some embodiments, the coupling means 620B and 622B include holes within the fabric of the fabric panel 600 and grommets located around the holes. Likewise, in some embodiments, the coupling means 620A and 622A include pins, latches, or other securing protrusions configured to reciprocally couple with the holes of the couplings means 620B and 622B when the holes are placed over the coupling means 620A and 620B. In other embodiments, the coupling means include buttons, zippers, Velcro, levers, buckles, or any other suitable means enabling the fabric panel to couple to the robot 100. In some embodiments, when the coupling means 620B are coupled to the coupling means 620A, and when the coupling means 622B are coupled to the coupling means when the fabric panel is coupled to the robot, the fabric of the panel is stretched and held in partial tension along the axis of the fabric panel from the opening 624 to the opening 626. The coupling means can be located on an inside surface of the fabric panel, beneficially enabling the fabric panel to couple to the robot 100 without the coupling means being visible (e.g., the coupling means may not include holes within the fabric panel, allowing for a seamless/holeless fabric exterior). In some embodiments, the coupling means include elastic bands (for instance, around an inside surface of the fabric panel adjacent to or within a threshold distance of the openings 624 and 626) that secure the fabric panel to the robot by tightening around reciprocal grooves within the head, body, and/or base. Such elastic bands can beneficially improve the ease of coupling the fabric panel to the robot, and can enable an installer to quickly align the fabric panel on the robot during installation by allowing the installer to move the fabric panel over the robot until the elastic bands snap into the reciprocal grooves.

While the fabric panel 600 covers certain sensors of the robot 100 when the fabric panel is coupled to the robot, such as the sensor array 612, the fabric panel can include one or more openings enabling other components of the robot to be exposed/not covered by the fabric. For example, the opening 628 corresponds to the sensor 610 such that when the fabric panel is coupled to the robot, the opening 628 is secured around the sensor 610 thereby exposing the sensor. Although only one opening is shown within the side of the fabric panel in the embodiment of FIG. 6B, in other embodiments, any number of openings can be included corresponding to any number of types of components of the robot. For instance, the robot body 604 can include cameras or other sensors that can be impaired by fabric, and the fabric panel can include openings to prevent such components from being covered by the fabric.

Although the fabric panel 600 of the embodiment of FIG. 6B is shown without an underlying structure, in some embodiments, the fabric panel can include a structure or skeleton to preserve the form or shape of the fabric panel. For instance, the fabric panel can include a first ring component along an inside perimeter of the opening 624 and a second ring component along an inside perimeter of the opening 626. The structure or skeleton of the fabric panel in such embodiments can be rigid or flexible.

In some embodiments, instead of one fabric panel 600 that secures around an entire exterior of the body 604 of the robot 100, several fabric panels can each be secured to a portion of a robot exterior. For instance, a first panel can secure to a left side exterior of the robot and a second panel can secure to a right side exterior of the robot. In such embodiments, each fabric panel can include an outside ring structure located around an outside perimeter of the panel.

The fabric panel 600 illustrated in FIG. 6B and described herein can be coupled to the robot 100 and subsequently removed from the robot. Such embodiments beneficially allow for the efficient and low-cost replacement of fabric panels, for instance in the event that the fabric panels get torn or damaged. Further, implementing removable fabric panels in covering the exterior of the robot allows for the branding or configuration of the fabric panels in a color, pattern, or including a logo customized by an owner or user of the robot. However, it should be noted that while removable fabric panels are described herein, in some embodiments, the fabric panels are fixedly coupled to the robot in a more-permanent fashion. It should also be noted that although fabric panels are described herein, in other embodiments, robots can have solid/rigid outer housings and perform the functions described herein.

Mobile Robot Architecture

Figure 7:
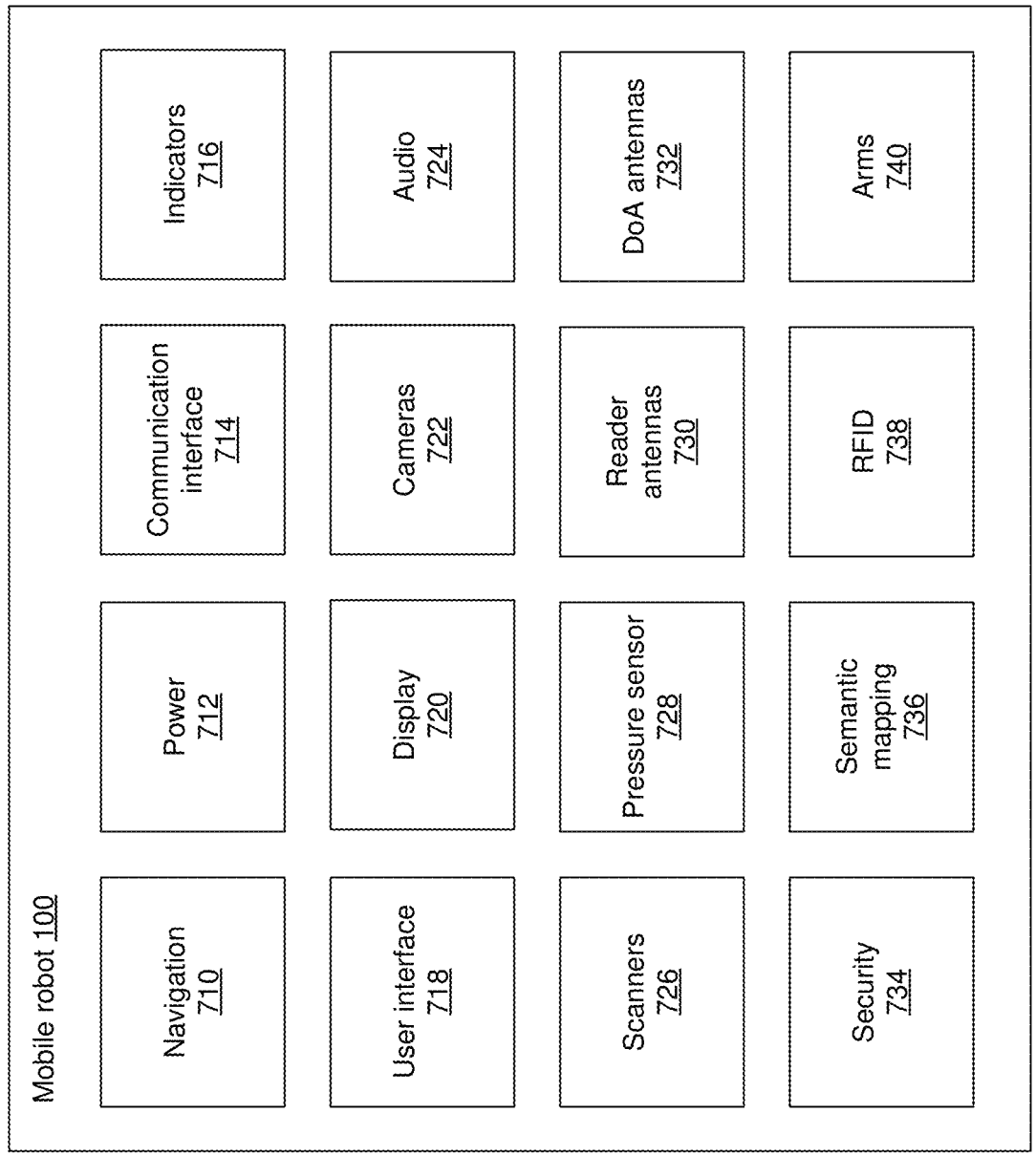
FIG. 7 illustrates a block diagram of a mobile robot architecture, according to one embodiment.

FIG. 7 illustrates a block diagram of a mobile robot architecture, according to one embodiment. The robot 100 of the embodiment of FIG. 7 includes a navigation system 710, a power system 712, a communication interface 714, various indicators 716, a user interface 718, a display 720, one or more cameras 722, an audio system 724, various scanners 726, a pressure sensor system 728, one or more reader antennas 730, one or more direction of arrival (or DoA) antennas 732, a security system 734, a semantic mapping system 736, an RFID system 738, and one or more arms 740. It should be noted that in other embodiments, a mobile robot 100 can include fewer, additional, or different components than those illustrated in the embodiment of FIG. 7. For instance, the robot 100 can include one or more hardware processors or controllers configured to perform various functionalities described herein.

The navigation system 710 is configured to move the robot 100 around a space, such as a store, a room, a floor, a building, a parking lot, or any indoor or outdoor space. The navigation system can include a motor (such as an electric motor), an engine, or any other systems capable of moving the robot. The navigation system can also include wheels, rollers, and the like configured to enable the robot to smoothly move. The navigation system can move the robot in a number of directions, for instance, forwards, backwards, or sideways. In some embodiments, the base of the robot is holonomic, enabling the robot to move in any direction. In some embodiments, the navigation system can rotate the robot clockwise or counterclockwise, for instance as much as 360 degrees. In some embodiments, the navigation system can turn the robot in place, without requiring a significant (if any) turn radius.

The navigation system 710 can move the robot 100 in response to receiving navigation instructions, for instance from a user of the central system 210, from a security personnel 250, or from another robot. In some embodiments, the navigation system moves the robot as part of a patrol, routine, or security protocol. Navigation instructions can include an end location and can determine a route from a current location of the robot to the end location, for instance by detecting obstacles and/or paths from the current location to the end location, by selecting a path based on the detected obstacles and paths, and by moving the robot along the selected path until the robot arrives at the end location. In some embodiments, the navigation instructions can include a path, an ordered set of locations, an objective (e.g., "patrol the 4$^{th}$ floor"), or a map, and the navigation system can move the robot based on the navigation instructions.

The power system 712 can include a power source, such as a battery, fuel, solar panels, or any other suitable source of power storage. The power system can provide power to the other components of the robot 100, such as the navigation system 710. The power system can also include a recharging system, for instance a plug/socket or other recharging interface. In some embodiments, the robot can navigate to a recharge station and can electrically couple the recharging system to the recharge station, enabling the recharge station to refill the power source of the power system. For example, the recharging system of the robot can include a socket within the robot protected by a pivoting door, and the recharge station can include a plug component. In such embodiments, the robot can navigate to the recharge station and can align the pivoting door with the plug component. The robot can then move towards the plug component such that the plug component pushes the pivoting door inward into the robot, and such that the plug component is inserted into the socket. The plug component can provide power to the power source via the socket. The power system can further include infrastructure electrically coupling the power system to the recharging interface and the other components of the robot.

The communication interface 714 can communicatively couple the robot 100 to other components of the environment of FIG. 2, such as the central system 210 or other robots, either directly or via the network 200. For instance, the communication interface can include receivers, transmitters, wireless controllers, and the like, and can receive information from and transmit information to and between components of FIG. 2 and other components of the robot. Examples of communication protocols implemented by the communication interface include WiFi, Bluetooth, Zigbee, 3G/4G, LTE, or any other suitable communication protocol. The communication interface can provide video captured by the cameras to an external monitor, or can receive instructions from an operator (for instance, via the central system).

In some embodiments, the robot 100 can choose to transmit information via the communication interface 714 based on a communicative status of the robot. For instance, in embodiments where the robot is patrolling a route within a building, the robot can transmit video and audio data captured during the patrol when the communication interface is coupled to the network 200 via a WiFi connection. In some embodiments, if the WiFi connection is lost, the robot can communicatively couple to the network via a secondary connection, such as an LTE connection. In such embodiments, the robot can modify the data sent via the communication interface before transmitting, for instance by transmitting only audio data, by performing lossy compression on the video before transmitting, by reducing the frame rate or resolution of the video before transmitting, by transmitting select images instead of video, by transmitting video data corresponding only to key events (such as video of a suspected unauthorized individual), by transmitting full-resolution video based on features within the video (such as faces) and low-resolution video otherwise, and the like. In the event of a total disconnection from the network, the robot can store information for subsequent transmission (for instance, when the communication interface is coupled to the network via WiFi or when the robot is docked at a charge station). Likewise, the robot can select data to transmit or can perform compression operations on the data before transmission if the bandwidth available to the robot falls before a threshold required to stream the data in real-time or other threshold. In some embodiments, the robot can store all detected information and data, for instance at full-resolution, for a set amount of time, until the robot's available storage capacity falls below a threshold, until the data is transmitted, until an operator instructs the robot to delete the data, or until any other suitable criteria is satisfied.

The indicators 716 can include visual indicators (such as LEDs or other lights), audio indicators, haptic indicators, vibration components, and the like. The indicators are configured to communicate information or a status associated with the robot 100 to an entity external to the robot, such as a user or individual. For instance, the indicators can include a ring of LEDs around a top surface of the robot that indicate a direction of movement of the robot. Likewise, LEDs can function as a turn signal, indicating a future direction change of the robot. The robot can also display emoji or other indicators of emotion, can display text identifying a status or current operation of the robot (e.g., "patrolling", "security alert", "danger alert", "intruder nearby", etc.) In some embodiments, lights or LEDs on the robot can change color to indicate a status of the robot (for instance, LED indicators can be green to indicate that the robot is available to assist customers, can be blue to indicate that the robot is busy performing a task, or can be red to indicate that the robot has detected a violation of a security policy). The robot also includes a hardware display 720 (such as a monitor or screen) configured to communicate information associated with the robot. For instance, the hardware display can display a map, images, a request (e.g., the text "How can I help you today?"), or any other suitable information. In embodiments where the hardware display is a touch-screen display, a user can interact with the displayed information, for instance to get additional information, to configure the display of information, to instruct the robot to perform an operation, and the like.

The robot 100 includes a user interface 718 configured to display information to an individual or user, for instance in response to a received request. In some embodiments, the user interface displays a graphic user interface ("GUI") including the information, for instance on the hardware display 720 or via the indicators 716. The GUI can display information detailing a status of the robot, information requesting credentials or other information from an individual, information providing instructions to a user (e.g., "follow me"), information associated with an environment or building in which the robot is located (e.g., store or product information), or any other suitable type of information. The user interface can also include infrastructure to enable a user or individual to interface with the robot. For instance, the user interface can include a keyboard or keyboard, one or more buttons or dials, a mouse, motion/gesture detection capabilities, and the like. In some embodiments, the user interface includes the hardware display, and the hardware display is a touch-sensitive display configured to receive inputs from an individual. Inputs received via the user interface can be provided to one or more other components of the robot, can configure the robot to perform various functions or to operate in various modes, and the like. In some embodiments, the user interface further configures a voice recognition engine configured to recognize a user's voice, enabling a user to speak to the robot (for instance, to request information, to command the robot to perform an security operation, or the like).

The cameras 722 can include any number of cameras or camera arrays. For example, the cameras can include cameras configured to capture images or videos directly or a distance in front of the robot, to the sides of the robot, behind the robot, or above the robot. In some embodiments, the cameras can move, pivot, tilt, pan, or rotate, for instance in response to a change in motion by the robot, in response to an instruction received by the robot, in response to detecting an object within a proximity of the robot, or in response to the performance of a security or other function by the robot.

The cameras 722 can capture images and video at any suitable resolution or frame rate. In some embodiments, an array of fixed cameras can capture video 360 degree video around the robot 100, while in other embodiments, one or more cameras can rotate around a central axis of the robot to capture 360 degree video. In some embodiments, camera pairs can capture 3D video, and in some embodiments, images or video captured by multiple cameras can be stitched together using one or more stitching operations to produce a stitched image or video. In addition to capturing images or video in the visible light spectrum, the cameras can capture images within the IR spectrum or can capture thermal images. Images and videos captured by the cameras can be provided to one or more other components of the environment of FIG. 2, for instance the central system 210 via the communication interface 714 and the network 200, beneficially enabling a remote operator of the robot to see the surroundings of the robot.

The audio system 724 can include components to capture and emit audio signals. For instance, the audio system can include one or more microphones configured to capture audio signals, such as audio signals that pass through the fabric panel 600 of the robot 100. Likewise, the audio system can include speakers configured to playback audio or sound to individuals within a proximity of the robot. In some embodiments, audio captured by the audio system can be provided to a component of FIG. 2, such as the central system 210 via the network 200 and the communication interface 714, beneficially enabling a remote operator of the robot to hear audio occurring within a proximity of the robot. Likewise, audio can be received by the audio system from an external entity for playback by the audio system, for instance voice commands from an operator of the robot to an individual within a proximity of the robot.

The scanners 726 can detect objects, obstacles, paths, or individuals within a proximity of the robot 100. Examples of scanners include laser scanners or rangefinders, radar, sonar, ultrasonic sensors, motion detectors, 3D depth sensors, thermal scanners, infrared or ultraviolet scanners, and the like. One or more scanners can be located near a base of the robot, for instance to identify objects that might obstruct or disrupt movement of the robot. One or more scanners can be located near a top of the robot, for instance to identify the immediate surroundings of the robot, beneficially enabling the robot to "see" over objects that might otherwise obstruct the viewpoint of scanners located near the base of the robot. In addition to detecting obstacles, objects, and individuals, the scanners can track moving objects or individuals, for instance to follow the movement of suspicious individuals. In some embodiments, information captured by the scanners is used by the navigation system when selecting a path of motion for the robot. Likewise, information captured by the scanners can be used by or provided to other components of the robot or an entity external to the robot (such as a component of FIG. 2), for instance via the communication interface 714.

The pressure sensor 728 can include a pressurized tube located around a base of the robot 100, and can detect objects or other obstructions within an immediate proximity of the robot in response to a determination that the robot has run into the object or obstruction. For instance, a robot can move down a hallway, and can inadvertently run into an individual's foot. In response to the contact with the user's foot, the pressure inside the tube increases, and the pressure sensor can detect the increase in pressure and determine that the robot has made contact with an obstruction.

In response to a detected increase in pressure within the pressurized tube, the pressure sensor 728 can determine that the robot 100 has come into contact with an obstruction, and can slow or stop the motion of the robot, for instance by instructing the navigation unit 710. The pressure sensor can determine the direction of the obstruction based on the current direction the robot was moving at the time of the detected pressure increase. In some embodiments, the pressure sensor includes a protective outer housing that, upon contact with an obstruction, exerts a reciprocal pressure on the pressurized tube for detection by the pressure sensor. The pressure sensor enables the robot to immediately detect contact with an obstruction and adjust a trajectory or movement of the robot, beneficially reducing the risk that the contact can cause damage or harm to the robot, an object, or an individual.

In some embodiments, the pressure sensor 728 can measure an amount of pressure exerted upon the pressurized tube. In such embodiments, the robot 100 can use the pressure sensor to apply an amount of force upon an object. For example, the robot may want to gently push open a door, and can move into the door until the pressure sensor detects that ten pounds of pressure are being exerted upon the pressurized tube. By measuring the amount of force applied by the robot onto an object using the pressure sensor, the robot can beneficially limit the amount of force applied to the object in order to reduce the risk that the application of force by the robot damages the object.

The robot 100 can include one or more reader antennas 730 configured to receive signals from entities external the robot (such as components of the environment of FIG. 2). The reader antennas can include any type of antenna, such as an RFID reader antenna, WiFi antennas, radio antennas, and the like. The robot can also include one or more DoA antennas 732 configured to determine a direction from which a signal is received. The reader antennas and the DoA antennas can be part of the communication interface 714, and information captured by the reader antennas and the DoA antennas can be provided to one or more components of the robot, or one or more entities external the robot (such as the central system 210).

The security system 734 configures the robot 100 to perform one or more security operations. For instance, the security system can configure the robot to investigation a suspicious sound, to obstruct the movement of an unidentified individual, or patrol a portion of a building. The security system can instruct other components of the robot during the performance of security operations, for instance by capturing video of an unidentified user using the cameras 722. The security system can receive instructions to perform the one or more security operations, and/or can receive information associated with one or more security protocols via an external source, such as the central system 210 or the security system 230. Likewise, the security system can provide information associated with the context, surroundings, or activity of the robot, or information associated with the performance of a security operation to an entity external to the robot.

The semantic mapping system 736 is configured to generate or update a semantic map associated with a location or setting in which the robot 100 is located. For instance, the semantic mapping system can generate a map associated with a patrol route through a building floor as the robot moves through the space. The location of obstructions, and paths within the building floor can be detected by the scanners 726 and recorded onto the semantic map. Likewise, objects can be detected during the robot's movement (for instance, by the cameras 722), and information describing the detected objects and the location of the detected objects can be included within a semantic map. Semantic maps generated or updated by the semantic mapping system can be provided to an entity external to the robot, for instance the central system 210, for storage and/or subsequent use. The generation of semantic maps by the semantic mapping system is discussed in greater detail below.

The RFID system 738 can identify RFID tags within a space and determination the location of the identified RFID tags. For instance, for store inventory objects, each tagged with an RFID tag, the RFID system can, during the course of movement within a proximity of the objects, detect the presence and location of the RFID tag (and thus, the object to which the RFID tag is coupled). The detected RFID tags and corresponding objects can be mapped onto a semantic map, and/or information associated with the detected RFID tags and the locations thereof can be provided to an entity external to the robot 100, such as the central system 210, for subsequent storage. In some embodiments, the RFID system can include short-range RFID readers capable of reading LF RFID or HF RFID tags from within a threshold distance, while in other embodiments, the RFID system can include long-range RFID readers capable of reading UHF RFID tags from greater than the threshold distance away but within a greater, second threshold distance. It should be noted that the RFID system can also read other types of tags according to the principles described herein, including NFC tags or devices, BLE tags or devices, and the like. The RFID system is described below in greater detail.

Figure 8:
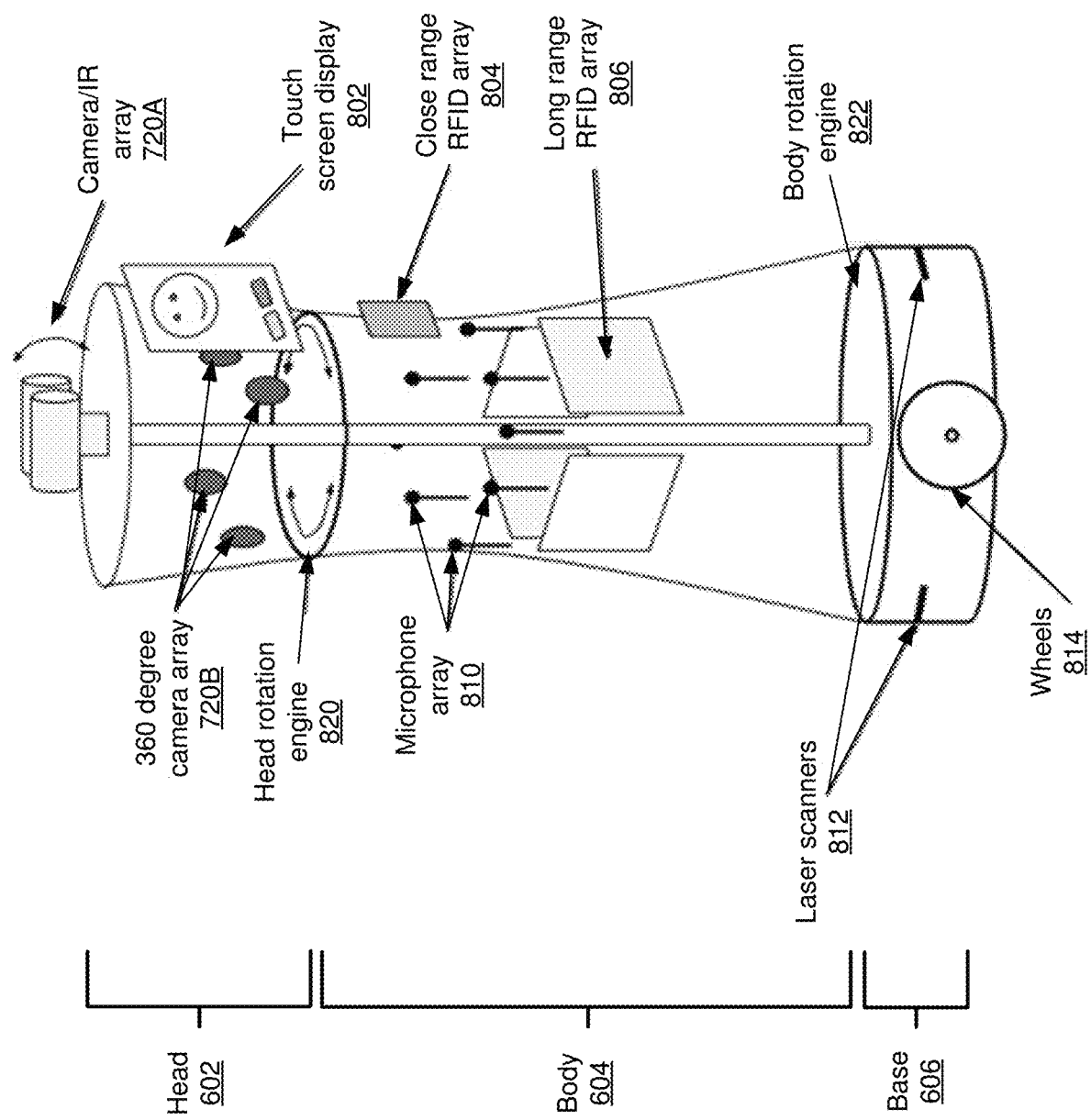
FIG. 8 illustrates a view of an example mobile robot and various robot components, according to one embodiment.

FIG. 8 illustrates a view of an example mobile robot and various robot components, according to one embodiment. The robot of FIG. 8 includes a head 602, a body 604, and a base 606. In the embodiment of FIG. 8, the head can rotate relative to the body without otherwise requiring rotation or movement by the robot via the head rotation engine 820. Enabling the head to rotate independently of the rest of the robot can beneficially enable the robot to rotate components coupled to the head, such as the camera/IR array 720A, the 360 degree camera array 720B, and the touch screen display 802. In other words, by rotating the head, the cameras and display of the robot of FIG. 8 can face different directions, allowing the cameras to capture video from a different field of view and allowing the robot to turn the touch screen display such that it faces an individual within a proximity of the robot.

In the embodiment of FIG. 8, the body 604 of the robot 100 can similarly rotate relative to the base 608 via the body rotation engine 822. Enabling the body 604 to rotate independently of the base can beneficially enable components coupled to the body to rotate, such as the close range RFID antenna array 804, the long range RFID antenna array 806, and the microphone array 810. In such embodiments, the antenna and microphone arrays can capture or detect signals from different directions, beneficially enabling the robot to optimize the angle of the antenna and microphone arrays relative to the signals captured or detected.

The base 608 of the robot 100 can similarly rotate, for instance using the navigation system 710. Rotating the base beneficially enables the robot to face different directions, to adjust an angle or trajectory of the robot, and the like. Likewise, rotating the base also rotates the laser scanners 812, beneficially enabling the laser scanners to scan in different directions. It should be noted that in some embodiments, the base can rotate while the body and 604 and head 602 of the robot do not rotate. For instance, the base can rotate 90 degrees counterclockwise, and the body can synchronously rotate 90 degrees counterclockwise, resulting in a rotation of the base 90 degrees relative to the floor without the rotation of the body and head relative to the floor.

The robot 100 can also include additional components not illustrated in the embodiments of FIGS. 7 and 8. For instance, the robot can include one or more projectors configured to project an image onto a floor or surface within a proximity of the robot. For example, the projectors can project a navigation symbol (such as an arrow) onto the floor to indicate to a user that the user should proceed in a particular direction indicated by the navigation symbol. Likewise, the projector can indicate a status or instruction, for instance instructing an individual to present a badge, presenting an indication that the user was authenticated or that the authentication failed, instructing the individual to stop moving, asking the individual if they need assistance, highlighting a requested product or object, and the like. The projectors can further project text, pictures, or icons associated with the robot or security information. For example, if a robot is guarding a passageway to prevent unauthorized users from entering the passageway, the robot can project a stop sign along with text indicating that the passageway is closed. The robot can also include a laser pointer, for instance to indicate a location of a product within a store.

The robot 100 can include one or more arms 740 for interacting with objects or individuals within a proximity of the robot. The arm can be an extendable boom arm, for instance that folds up against or retracts into the robot body when not in use. The robot arms can be used for instance to receive an object from or present an object to an individual, to press an elevator button, to move an object, to open or close windows or doors, to lock or unlock windows or doors, and the like. In some embodiments, a robot arm can include a camera, RFID reader, or other al. In such embodiments, the robot arm can be positioned or extended in order to provide a better position or vantage point for the camera, RFID reader, or other sensor. For example, an extendable robot arm equipped with a camera can be extended to capture video on the other side of an obstruction or wall, or to capture video of an area or crowd from a better vantage point. In embodiments where a robot arm is extended, the robot may reposition or balance itself to compensate for the shift in the center of gravity of the robot, for instance using inertial sensors (such as 3-axis gyroscopes, accelerometers, or magnetometers). The robot arm is described below in greater detail.

The robot 100 can also include one or more of: a spotlight or other lighting system for illuminating a room or area, strobe lights or other flashing lights to ward off intruders or otherwise deter particular behaviors of individuals, GPS receivers, sirens or alarms (which may be included within the audio system 724), beacon components configured to alert other robots, non-lethal deterrent components (such as tasers, tranquilizers, nets, tear gas, and the like), force or torque sensors (to detect the position and strength of contact between the robot and the environment or individuals within a proximity of the robot), civilian or police radios, fire extinguishers, emergency/assistance buttons or other interfaces (that enable users to call for help), emergency stop buttons or other interfaces (that enable users to immediately stop the movement of the robot), temperature sensors, light sensors, chemical/gas sensors, actuators configured to move any other components of the robot, or any other suitable components.

It should also be noted that the robot 100 includes component necessary to communicatively couple and control the components of the robot, including but not limited to: on-board computers, controllers, and processors; electric circuitry (e.g., motor drivers); computer memory; storage media (e.g., non-transitory computer-readable storage mediums, such as flash memory, hard drives, and the like); communication buses; cooling or heat dissipation systems; and the like.

Security Functions

As illustrated in the environment of FIG. 2, a set (or fleet) of robots can be deployed within a particular space, such as a building, a building floor, a campus, and the like. The set of robots 100 can be controlled by one or more robot operators, for via the central system 210 or the remote access interface 240, and can perform various security operations, for instance to augment existing security systems. For instance, an operator can directly instruct robots to perform various security operations via the robot interface 314 of the central system, or can implement one or more security protocols that include the performance of security operations by robots via the security engine 318. Likewise, a robot can perform one or more security operations, for instance in response to receiving an instruction from an operator or from the central system. A robot can receive instructions to perform security operations from the security system 734, for instance autonomously (without explicit instructions from an operator or other external entity) during the normal course of operations, for instance as part of a patrol routine, or in response to detecting suspicious activity or other circumstances that trigger one or more criteria for performing security operations.

The robot 100 can interact with one or more hardware systems or other infrastructure of a building, campus, site, or the like. An example of such hardware systems includes a camera array. The camera array further includes a wireless transceiver configured to receive information from the robot (for instance, instructions to record video or to change a field of view of the camera array, or audio to play over the speaker array) and to transmit information to the robot (for instance, video captured by the camera array streamed in real-time, or audio captured by the microphone array). The camera array can be connected to the robot through a building network, such as the network 200. The camera array can be physically attached at various locations within a building, for instance to a ceiling or wall in each of a set of rooms of a building, in areas with strategic vantage points, or near hallways, doors, or entry points.

The central system 210 can interact with one or more robots 100 and other infrastructure systems 220 and security systems 230 to perform one or more security operations. The central system can receive data from the one or more robots, infrastructure systems, and security systems; can aggregate, normalize, or otherwise format the received data; and can display the formatted data within an interface. Security interfaces are described below in greater detail. The central system can also request particular data from particular robots, infrastructure systems, or security systems; can instruct robots, infrastructure systems, and security systems to perform one or more security operations, either independently or in concert with other robots, infrastructure systems, or security systems; or can implement one or more security policies. It should be noted that the functions of the central system described herein can be performed in response to input from a user or operator of the central system, or without receiving inputs from a user or operator (for instance, autonomously or in response to detected security criteria that trigger the performance of security operations).

The central system 210 can aggregate sensor data from one or more robots 100, infrastructure systems, or security systems. For instance, the central security system can receive locations of individuals within a building from multiple robots and security cameras, and can combine the location information to determine refined locations of each individual within the building. Likewise, the central system can interpolate data received from multiple sources, for instance by averaging temperatures detected in each room in a building to determine an average temperature for each room. Finally, the central system can receive information describing a state of one or more objects in a location, for instance the power levels, capabilities, or locations of each robot within a building.

The central system 210 can manage multiple maps for a location, for instance stored building maps and blueprints, semantic maps describing a building or area, and simultaneous location and mapping (or "SLAM" maps) generated by a robot 100 or other system configured to scan a location or area. In some embodiments, the central system can coordinate between multiple maps of the same location, for instance by updating older maps to include the location of objects that newer maps indicated have moved, or by incorporating types of information present in a first map but not a second map into the second map (for instance, the location of windows, whether a door is locked or unlocked, or the location of security cameras).

The central system 210 can implement one or more security policies, such as a building security policy. For instance, a security policy can specify one or more security criteria, such as: patrol routes within a building, can specify a frequency of patrolling each route, can specify access credentials required for an individual to be in one or more portions of the building, can specify acceptable threshold values or ranges for sensors within the building (such as minimum or maximum temperatures, sound magnitudes, characteristics of video data captured by cameras), can specify acceptable or forbidden actions or activities for individuals within one or more building portions, can define geofences describing portions of a building that can be accessed or that are off-limits (for instance, by time, by access credential), and the like. In some embodiments, the security criteria are time-dependent, and can vary based on whether the current time falls within a time range specified for the security criteria.

In implementing the security policy, the central system 210 can instruct one or more robots 100 to perform a task (such as patrol a route or intercept an individual that isn't authorized to be in a particular location), can instruct security cameras to change viewpoint and/or capture video of a location associated with a potential violation of a security policy, can request sensor data detected by one or more infrastructure systems 220 or security systems 230, and the like. In some embodiments, security policies can be implemented in response to the detection of one or more security criteria. For instance, if an individual is detected in an off-limits portion of a building or a suspicious sound is detected, the central system can dispatch one or more robots or security personnel to investigate.

As noted above, the central system 210 can also instruct one or more robots 100 and/or one or more infrastructure systems 220 or security systems 230 to perform a security operation in response to a request from a robot, in response to receiving information from a robot (such as information indicative of a security violation or threat), or in response to a request or information from an infrastructure system or security system. The central system can prioritize security operations, and can instruct the one or more robots, infrastructure systems, and security systems to perform security operations based on the priority of each security operations. For instance, if the central system identifies ten security operations that need to be performed by five robots, the central system can prioritize the ten security operations, and can instruct the five robots to perform the five highest priority operations first, and when those operations are complete, can instruct the robots to perform the remaining five security operations. The central system can account for the capabilities and availability of each robot, infrastructure system, and security system before instructing these robots and systems to perform security operations. For instance, the central system can determine that of two robots, a first is able to perform a particular operation (such as an IR scan) and a second isn't, and can instruct the first robot to perform the operation (and not the second, even if the first robot is currently occupied).

The central system 210 can record and store data received from one or more robots 100, infrastructure systems 220, and security systems, for instance within log files in memory accessible to the central system. In addition, the central system can report or log any suspicious activity, detected security anomalies, detected threats or alerts, or any potential or actual violations of security policies, for instance to security personnel 250 or to an operator or user of the central system. The central system can also coordinate communications between components of the environment of FIG. 2, for instance by receiving messages from one or more of the systems and routing the message if needed to one or more other systems. In doing so, the central system can synchronize information, for instance by applying time stamps to the information, by aggregating the information by time, and by routing messages in chronological order based on the time of the aggregated information or based on the time each message was received.

As noted above, an implementation of the central system 210 can present a security interface to an operator. The operator can review data provided by the robots 100, infrastructure systems 220, and security systems 230 and presented within the interface. The information presented by the security interface can be updated in real-time, for instance reflecting updated information received from the robots, infrastructure systems, and security systems. For example, the security interface can update the location of the robots within a building in real-time. The operator can coordinate the actions of multiple robots, can assign patrol routes to robots and can alter patrol routes as the robots are patrolling the routes, can dispatch robots to investigate security anomalies or suspicious activity, and can assign particular security operations to particular robots.

The central system 210 can notify security personnel 250 or other individuals or groups to inform the security personnel of security violations, suspicious activities, security anomalies, and the like. For instance, the central system can send text or SMS messages, emails, or voice calls to security personnel, to police, to a company's employees or managers, and the like. Likewise, the central system can field queries from robots 100, infrastructure systems 220, security systems 230, security personnel 250, users of a remote interface 240, and the like, and can provide information gathered by the central system in response to the queries. For example, the central system can provide a map of all RFID readings as detected by a fleet of robots to a requesting entity. Likewise, the central system can store and provide a WiFi heat map, a temperature map, and the like to users of the central system, and can generate (either periodically, automatically, or in response to user request) reports of anomalies, security events, patrol coverage, or building properties for review by users of the central system.

In some embodiments, the robots 100 may not include the necessary computing power to perform certain functions (or may include the necessary computing power but may not be able to perform such functions in a time-efficient manner), including both security operations (such as facial detection) and non-security operations (such as national language processing). In such embodiments, the robots can request that the central system 210 (which may include greater processing capabilities and resources) to instead perform such functions. For example, a robot can receive a request from a user asking "How do I get to the conference room?", and can send the recorded voice sample to the central system, which can parse the voice signal and determine the user's intent. Continuing with this example, the central system can identify a set of navigation instructions to the conference room to the robot, and the robot can provide the navigation instructions to the user. Likewise, a robot can request that the centralized server compress data, perform video processing tasks, to stream video to other robots or entities, to perform machine learning tasks, or to perform any other processing- or resource-intensive tasks, and can provide the data to perform such tasks to the central system. The central system can also access a building's or company's databases or processing resources (such as servers or other computer systems), for instance to identify an individual within a building or to use the accessed processing resources to perform a computationally-intensive task.

Although the central system 210 is described herein as a single entity, it should be noted that in some embodiments, the central system can include any number of systems operating in concert. For instance, the central system 210 can be implemented within a data center, by several communicatively coupled servers, or the like. Finally, it should be noted that in some embodiments, the tasks performed by the central system may instead be performed by other components of the embodiment of FIG. 2, by systems configured to directly communicatively couple with each other (for instance, the robot 100 and a security camera system), or by two or more robots configured to communicatively couple with each other.

The robot 100, in response to determining that the robot has lost connectivity with the network 200 during the patrolling of a route (for instance, while patrolling in a dead zone or while the robot is using an elevator), can return to an earlier location with the route where the robot was connected to the network. Likewise, in some embodiments, the robot can move to a location further along the patrol route until connectivity is restored. While the robot is disconnected from the network, all data connected by the robot (related to security or otherwise) can be stored until connectivity is restored. When the robot is able to reconnect to the network, the robot can upload the stored data (for instance, to the central system 210). For example, the robot may lose connectivity with the network 200 while in an elevator. Details with on actions taken by the robot when losing connection is discussed below with respect to FIGS. 12A-12C.

In some embodiments, the robot 100 can determine its location without using a map (for instance, in response to a mapping error). For instance, the robot can ask a nearby human for help, can use RFID tags found in a vicinity of an area and can identify a historical location of the RFID tags, can ask nearby robots for location information, can query the central system 210 for the robot's location, can use 3D information or 2D/map layout information to determine the location of the robot, and the like.

As noted above, the robot 100 can perform operations in addition to security operations. For instance, the robot can be located within an entrance or doorway and greet people as they enter or leave an area. The robot can request janitorial service in response to detect a mess within a proximity of the robot, and can act in self-defense in the event that someone tries to tamper with the robot or with another security system or infrastructure system.

In some embodiments, the robot 100 can delivery objects, packages, paperwork, and the like to an individual, for instance by querying a map, the central system 210, another robot, or any other system or entity that tracks the location of individuals. In response to identifying a location of the individual, the robot can navigate to the individual, can verify the individual's identity (for instance, by scanning an RFID badge of the individual, by performing facial or voice recognition on the individual, or by any other suitable means), and can have the individual sign for the delivery before providing the object to the individual. In some embodiments, the robot can enable guests to check-in via the robot's touchscreen display. In other embodiments, the robot can enable individuals near the robot to report emergency situations, for instance a fire nearby, an unauthorized individual within the vicinity, a medical emergency, and the like.

It should be noted that in the examples of robot functionality described above, an exhaustive list of security operations that a robot can perform is not given for each example for the purposes of simplicity. However, it should be noted that any security operation described herein or otherwise can be performed by the robot in any context described herein, and that the lack of description of a particular security operation in a particular context does not indicate that the robot is unable to perform the security operation in that context.

Semantic Mapping

As noted above, the semantic mapping system 736 of the robot 100 can generate or update a semantic map associated with a location or setting in which the robot is located. As used herein, a "semantic map" refers to a map that includes one or more objects, entities, or individuals, and that includes a meaning, description, identity, or status of the identified objects, entities, or individuals. Semantic maps generated by the semantic mapping system can be stored locally by the robot, or can be uploaded to the central system 210 for storage in the semantic maps storage module 342.

In some embodiments, the robot 100 can generate a semantic map from scratch, while in other embodiments, the robot can update an existing semantic map or can generate a semantic map from a non-semantic map, for instance by adding semantic details (such as information describing the location, identity, status, or other characteristics of detected objects) to the non-semantic map. In embodiments, where the robot generates a semantic map from scratch, the robot first generates an area map identifying obstacles and pathways using, for instance, one or more of the scanners 726 (such as a laser rangefinder or other suitable depth sensor) and a simultaneous localization and mapping (or "SLAM") algorithm. As used herein, such maps are referred to as "SLAM maps".

While SLAM or other areas maps ("non-semantic maps" hereinafter) can be useful for the purpose of robot navigation within an area, the rangefinders or depth sensors used by the robot 100 to generate the SLAM map do not generate information about what detected obstacles or objects are, or how the robot should handle or interact with the detected obstacles or objects. The robot can detect and classify or identify objects, and can determine a state or other characteristics of the objects. Information describing the classified/identified objects and the corresponding detected states or other characteristics of the objects are stored in conjunction with the non-semantic maps, in association with a location of the objects relative to the non-semantic map. The generation of a semantic map refers to the inclusion of information describing objects represented within the map (and their corresponding detected states and characteristics).

In some embodiments, objects can be detected and identified by the robot 100 using one or more sensors, for instance cameras, RFID readers, IR sensors, and the like. For example, the robot can capture an image of an object, and can apply image detection or classification algorithms to identify the object type. Likewise, the robot can analyze images of the object to determine a state of the object. For instance, if the robot detects a door, the robot can also detect whether the door is open or closed. In some embodiments, the identification of objects and object states or characteristics can be manually provided by a system administrator, a robot operator, an employee or individual associated with the robot, and the like. In some embodiments, the robot can access object identification and state information from a repository of object information, such as a building database identifying the location and expected state of various objects within the building. In some embodiments, object information can be received from other robots that have scanned locations and identified objects within the locations. Object information can also be received from accessing the central system 210, one or more infrastructure systems 220, or one or more security systems 230. For instance, for a smart door, the robot can query the state of the smart door (e.g., locked or unlocked) via the network 200. Likewise, the robot can query a building elevator system to determine the current floor of an elevator.

Examples of detected objects and corresponding object states and properties (if applicable) include:

Doors: open/closed, locked/unlocked, required security credentials to unlock
Windows: open/closed, locked/unlocked, broken
Elevators: number, current floor, button location, the date of last inspection (determined by scanning text of an inspection certificate within the elevator)
Stairs: number of floors
Bathrooms
Lights: on/off, location of light switch, in need of replacing (burnt out bulbs)
Plumbing/piping locations: water damage/leaks
Trashcans/recycling bins/compost bins: last emptied, in need of emptying
Rooms: room type (such as office, kitchen, conference room, bathroom, common area, game room, storage closet, guard station, laboratory, computer room, utilities room, and the like), room number, locked/unlocked, required security credentials to access, normal temperature range, current occupancy
Access devices: lock types, card readers, RFID readers
Conference rooms: in use/reserved/free, Fity, conference room assets (desk, number of chairs, computer equipment, monitor/display/projector, white board), room number
Desks: owner, equipment (chair, computer, computer dock)
Walls: type (glass, plaster, moveable, etc.), location of doors within walls
Building structural obstacles (such as pillars, columns, etc)
Thresholds: geofences, boundaries between rooms, access credentials required to cross
Ramps
Hallways
Kitchens: available equipment (microwaves, refrigerators, sinks, water fountain, ice machine, tables, chairs, etc.)
Water fountains
Fire extinguishers: the date of last inspection
Smoke alarms: the date of last inspection
Fire sprinklers or other fire suppression systems: the date of last inspection
Vents
Power outlets
TVs and monitors
Computers and computer equipment: printers, servers, keyboards, keypads, tablets
Network equipment: routers, switches, modems, networking cables, servers, network names, local area network equipment
High-value assets: artwork, safes, secure document repositories or cabinets, secure computer equipment, cash registers, ATMs, lab equipment, medical equipment
Security systems: guard stations, security cameras, access gates, audio detectors, motion detectors, aerial systems, security displays
Robot systems: robots, charge stations, robot docks, robot patrol routes
Infrastructure systems: temperature sensors, power systems, generators
Retail objects: racks, displays, shelves, drawers, inventory object types, kiosks, checkout desks
Decorative objects: paintings, sculptures, plants
First aid kits
Locations of frequent false positives (objects frequently identified as people, etc.)

In addition, a robot 100 can determine usage patterns of detected objects (such as any of the detected objects listed above), and information describing such usage patterns can be included within the semantic map. For instance, a robot can query a building system to determine the floors in a building most frequently visited by an elevator, can access a scheduling system of a building to determine historical usage patterns for conference rooms, or can monitor a kitchen area to determine the times of a day when the kitchen is the most crowded. Likewise, a robot can determine behavior or movement patterns of people within an area, and information describing such patterns can be included within the semantic map. For instance, a robot can query a security system to determine a list of people who frequently pass through an access gate, or can track individuals (for instance, by scanning the RFID badges of the individuals) to determine historical patterns of movement of the individuals.

The robot 100 can use a semantic map to identify infrastructure systems 220 and security systems 230 closest to a particular location. For instance, if the robot detects a potential intruder within a building at a given location, the robot can query the semantic map to identify security cameras closest to the given location, and can instruct the security cameras to look for and record video of the potential intruder. Accordingly, the robot can query a semantic map with a location to identify infrastructure or security systems closest to the location, and can perform an action (such as a security operation) using the identified infrastructure or security systems.

Mechanical Arm on a Rotatable Ring

Figure 9A:
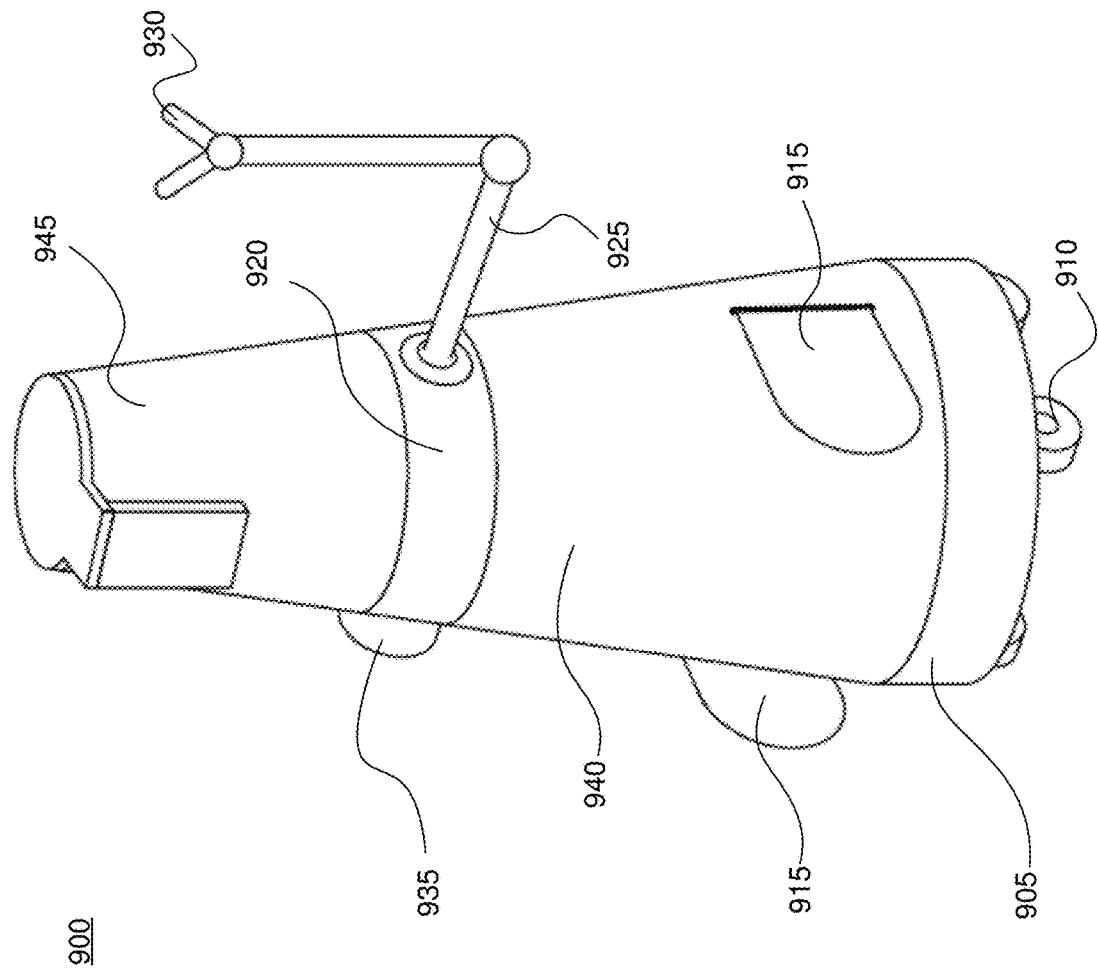
FIGS. 9A and 9B illustrate a mobile robot with a mechanical arm at different positions, according to one embodiment.
Figure 9B:
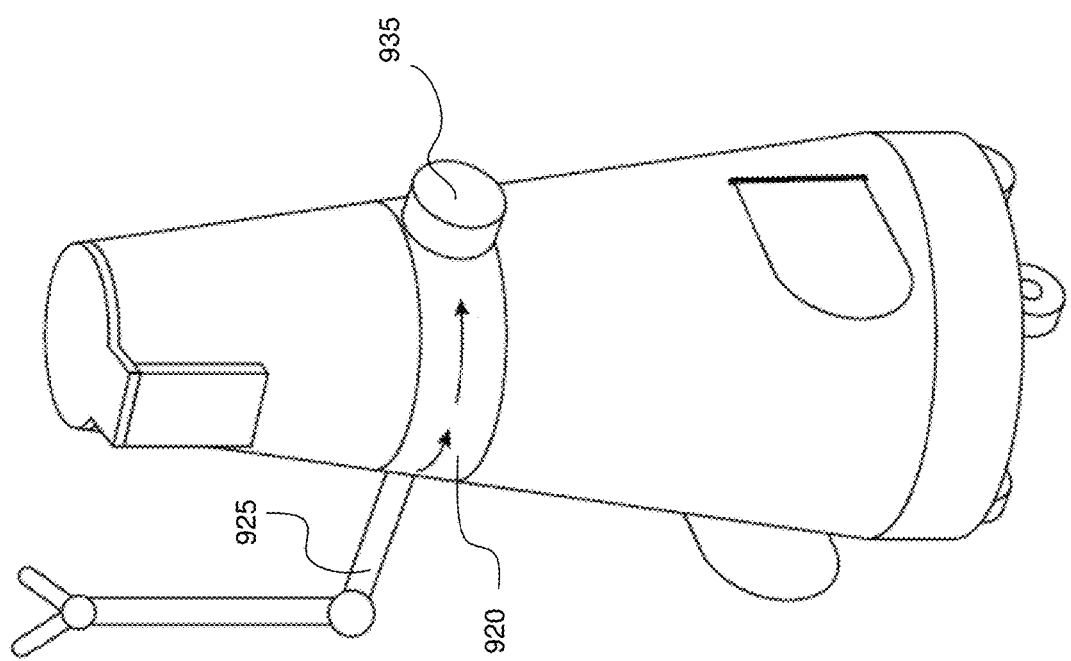

FIGS. 9A and 9B illustrate a mobile robot with a mechanical arm at different positions, according to one embodiment. The mobile robot 900 (or simply "robot" hereinafter) includes a motorized base 905, one or more wheels 910, one or more flippers 915, a rotatable ring 920, a mechanical arm 925, a mechanical hand 930, a counterweight 935, a robot body 940, and a robot head 945. In the example shown in FIGS. 9A and 9B, the robot 900 has one mechanical arm 925. However, in other examples, the robot 900 may have more than one mechanical arm 925. In some embodiments, the mobile robot 900 may include fewer, additional, or different components.

Although not shown in FIGS. 9A and 9B, the robot 900 includes components necessary to communicatively couple and control the components of the robot, including but not limited to: on-board computers, controllers, and processors; electric circuitry (e.g., motor drivers); computer memory; storage media (e.g., non-transitory computer-readable storage mediums, such as flash memory, hard drives, and the like); communication buses; cooling or heat dissipation systems; and the like. In the descriptions below, the robot 900 has one or more controllers (not illustrated in FIGS. 9A and 9B) that communicate with the central system 210, and based on the communication, control moving parts of the robot 900 such as the rotatable ring 920, mechanical arm 925, mechanical hand 930, flippers 915, and the motorized base 905. The one or more controllers can receive a request from the central system 210 that specifies a function that the robot 900 is to perform. The request may include information such as an object that the robot is to interact with, target location of the robot, and operations that the robot is to perform. The one or more controllers can also send updates to the central system 210.

The robot 900 may be a variation of the mobile robot 100, and the robot 900 may include one or more elements of the mobile robot architecture for the mobile robot 100 discussed above with respect to FIG. 7. As discussed above, the robot 900 may be connected to the central system 210, the infrastructure system 220, the security system 230, the remote access 240, and the security personnel 250 via the network 200.

The motorized base 905 allows the robot 900 to move within a geographical location using the one or more wheels 910. The motorized base 905 may be a part of a navigation system (e.g., navigation system 710) that moves the robot in a number of directions, allowing the robot 900 to perform various functions at different locations. The motorized base 905 may receive navigation instructions from the navigation system that directs the robot from a current location of the robot 900 to an end location.

The motorized base 905 can include wheels, rollers, and the like that are driven by one or more motors. The one or more motors may be connected to the one or more controllers that sets the direction, acceleration, speed, and other motion parameters based in part on the functions that the robot 900 is performing. It should be noted that in addition to moving the robot 900 throughout a location, the motorized base 905 may rotate the robot in place, without changing the location of the robot relative to the ground.

The robot 900 can include one or more flippers 915 that are coupled to a lower portion of the robot to prevent objects from blocking a trajectory of the robot 900. A flipper 915 can be a flat, paddle-like structure that extends outwards from the surface of the robot 900. However, the flipper 915 can vary in size and shape. The flipper 915 may be made of a material that can support significant force (e.g., weight of a door applied to the flipper) while being flexible and smooth such that the flipper 915 does not get caught on surrounding objects or damage the surrounding objects. For instance, the flippers 915 can include rubber, plastic, metal, composite materials, or any combination thereof. In some embodiments, the flipper 915 includes one or more rollers at a distal end of the flipper, which allows the flippers to roll along a surface abutting an extended flipper, enabling the robot to pass through narrow spaces (e.g., a narrow hallway) more easily and avoiding causing scratches in surrounding surfaces such as walls, furniture, and doors.

The flippers 915 may be coupled to the motorized base 905 or to the robot body 940. In one embodiment, the robot 900 includes two flippers 915 that are each attached to a different side of the robot 900 such that the distribution of flippers on the robot 900 is symmetrical. In another embodiment, the robot 900 can include a flipper 915 that attaches to a front surface of the robot 900 with respect to the robot body 940 and robot head 945. The flippers 915 can be attached to a lower portion of the robot 900 such that the flippers 915 are closer to the ground than to the robot head 945 to prevent the robot 900 from tipping over when force is applied to the flippers 915. In some embodiments, the flippers 915 can be controlled by a motor that causes the flippers 915 to fold against the robot 900 when the flippers are not in use and extend outward away from the robot 900 when the flippers are being used.

As discussed below with respect to FIGS. 10A-10D and 11, the flippers 915 can be used to hold a door open while the robot 900 passes through the door. The flippers 915 can also be used to move an object from one location to another location. For instance, if the robot 900 detects an object along a path that may be hazardous (e.g., a tripping hazard), the robot 900 may engage the flippers 915 to make contact with the object and then push the object to a safe location using the motorized base 905.

The rotatable ring 920 encircles and rotates about the robot body 940. The rotatable ring 920 is coupled to the mechanical arm 925 and the counterweight 935. In one embodiment, the mechanical arm 925 and the counterweight 935 are on opposite sides of the rotatable ring 920 such that the position at which the mechanical arm 925 is coupled to the rotatable ring 920 is 180 degrees away from the position at which the counterweight 935 is coupled to the rotatable ring 920. The rotatable ring 920 is configured to rotate 360 degrees about the robot body 940 in both clockwise and counterclockwise directions. The rotatable ring 920 may by coupled to a motor that rotates the rotatable ring 920 by a particular angular distance according to instructions received from a controller. Responsive to determining an action to perform, the controller may determine a current position of the mechanical arm 925 with respect to the robot 900 and calculate an angular distance between the current position and a desired position of the mechanical arm 925. Based on the calculated angular distance, the controller can drive the rotatable ring 920 until the mechanical arm 925 is at the desired position. Coupling the mechanical arm 925 to the rotatable ring 920 enables the robot 900 to be ambidextrous without having two mechanical arms 925. The robot 900 may perform both left-handed and right-handed tasks with a single mechanical arm 925 by moving the rotatable ring 920 to a desired position for performing the tasks. In some embodiments, the robot 900 may not have a rotatable ring 920, and the mechanical arm 925 is directly coupled to the robot body 940. The robot 900 may rotate the entire robot 900 via the motorized base 905 to position the mechanical arm 925 at the desired position.

The mechanical arm 925 is an extendable robot arm for interacting with objects or individuals within reach of the mechanical arm 925. The mechanical arm 925 may be divided into a plurality of arm segments. In one embodiment, the mechanical arm 925 has a first arm segment (e.g., an upper arm) and a second arm segment (e.g., a lower arm). The first arm segment can be coupled to the robot body 940 via a first joint on one end and coupled to the second arm segment via a second joint on another end. The first joint functions as a "shoulder" of the robot arm and enables the mechanical arm 925 to rotate about the first joint. The mechanical arm 925 may rotate 360 degrees in a clockwise direction and in a counter clockwise direction. The second joint functions as an "elbow" of the mechanical arm and works as a hinge that enables the second segment to bend the second arm segment towards the robot body 940 and away from the robot body 940. The second joint may allow the second segment to have at least a motion range of 180 degrees. When used in combination with the rotatable ring, the mechanical arm 925 can have six degrees or more of freedom that allows the mechanical arm 925 to change position within a three-dimensional space (e.g., forward/back, up/down, left/right) and change orientation The mechanical hand 930 is attached to the mechanical arm 925 and configured to perform actions such as grabbing and releasing an object. The mechanical hand 930 may be removable or fixedly coupled to the mechanical arm 925. The mechanical hand 930 may have one or more fingers and a wrist that connects the mechanical hand 930 to the mechanical arm 925. In some embodiments, the mechanical hand 930 is a detachable piece of the mechanical arm 925. There may be several variations of the mechanical hand 930 for different functions of the robot 900 and one mechanical hand 930 may be replaced with another mechanical hand 930 depending on the type of task that the robot 900 is performing. It should be noted that different variations of arm segments, joints, and hands than those described herein can be incorporated according the principles described herein.

In one embodiment, the robot 900 includes a plurality of mechanical arms 925. The robot 900 may include a first mechanical arm 925 that is coupled to the rotatable ring 920 at a first location and a second mechanical arm 925 that is coupled to the rotatable ring 920 at a second location. In one embodiment, the first location and the second location are separated by 180 degrees. In another embodiment, the first location and the second location are separated by an angular distance different from 180 degrees. When the robot 900 has two mechanical arms 925, the robot 900 may have two identical mechanical arms 925 or may have two different types of mechanical arms 925 that are configured to perform different motions. For example, the first mechanical arm 925 may be configured to support a high payload or supply a large amount of force, and the second mechanical arm 925 may be configured to perform tasks that involve high dexterity. The first and the second mechanical arms 925 may be coupled to different types of mechanical hands 930 that are designed for different functions, which increases the functionalities that the robot 900 can perform. It should also be noted that in some embodiments, each mechanical arm can be coupled to a different rotatable ring.

The counterweight 935 is attached to the rotatable ring 920 opposite from the mechanical arm 925 and configured to counterbalance the weight of the mechanical arm 925. The counterweight 935 may weigh less than, the same as, or more than the mechanical arm 925. The counterweight 935 can be extendable outward and away from the robot 900 to offset the moment arm of the mechanical arm 925. In one embodiment, instead of the counterweight 935, another mechanical arm 925 is attached to the rotatable ring 920 such that the two mechanical arms 925 are on opposite sides of the rotatable ring 920.

The robot 900 includes sensors and cameras for gathering real-time details of a surrounding environment. The sensors can include one or more of: a light sensor, an IR sensor, a temperature sensor, a pressure sensor, a touch sensor, a gyroscope, an accelerometer, a sound detector, and the like. The robot 900 also includes access credentials (such as a key fob, an identity card, or an RFID-enabled object). The sensors and the access credentials can be located anywhere on the robot 900 including the motorized base 905, the robot body 940, the rotatable ring 920, the mechanical arm 925, mechanical hand 930, and the robot head 945. In one embodiment, the mechanical arm 925 may include one or more pressure sensors located at different positions throughout the mechanical arm 925 configured to measure a magnitude and a direction of force applied to the mechanical arm 925 at the different positions. The mechanical arm 925 may have a plurality of pressure sensors at a contact point on an outer surface of the mechanical arm that often makes contact with another object. For example, the robot 900 can use the mechanical arm 925 to hold the door open as the robot 900 passes through the doorway in a similar way that a person may hold a door open with an elbow. A pressure sensor may be located at the second joint to measure the force applied to the second joint as the robot 900 is holding the door open.

The robot 900 may have a camera system including a plurality of cameras at different parts of the robot 900. The plurality of cameras may be positioned on the robot 900 to provide a 360 view of a surrounding environment. The camera system may include one or more depth cameras that allows the robot 900 to collar image data of the surrounding environment and calculate a distance between the robot 900 and an object, building structure, people, cars and the like. The robot 900 can include one or more cameras on the mechanical arm 925 that allows precise arm movement. In one embodiment, the robot 900 includes a camera on the mechanical hand 930, but the camera may be located anywhere on the mechanical arm 925. After collecting image data from the plurality of cameras, the robot 900 may process the image data to identify objects surrounding the robot 900 as well as the relative locations of these objects. A controller of the robot 900 may process the image data or send a request to the central system 210 to process the image data instead.

As shown in FIG. 9A, the mechanical arm 925 is at a first position relative to the robot head 945. A controller of the robot 900 may receive instructions from the central system to perform a function such as opening a door using the mechanical arm 925. The controller may generate a motion plan to put the mechanical arm 925 in a position to perform the function. The motion plan can specify a position, orientation, and force for the mechanical arm 925 as a whole or can specify a position, orientation, and force for each of the plurality of segments and joints in the mechanical arm 925. As shown in FIG. 9B, the controller of the robot 900 may rotate the rotatable ring 920 in a counterclockwise direction until the mechanical arm 925 is at a second position relative to the robot head 945, for instance without requiring any motion by the robot base 905, the robot body 940, or the robot head 945. When generating the motion plan for the mechanical arm 925, the controller can apply a set of constraints to keep excess degrees of freedom open in the motion of the mechanical arm 925. The controller may avoid generating a motion plan where joints in the mechanical arm 925 align, resulting in kinematic singularity. The controller may also restrict positions for different parts of the mechanical arm 925 to enable a larger range of motion. For example, the motion plan may prevent the second joint (e.g., the "elbow" of the mechanical arm 925) from being positioned outside of a certain height range with respect to the robot body 940 since positions outside of the range can restrict future range of movement for the mechanical arm 925. That is, the mechanical arm 925 has a wider range of motion when the second joint is kept at mid height with respect to the robot body 940 compared to the mechanical arm 925 being positioned such that the second joint is above the robot body 940 by the robot head 945.

Opening a Door Using a Mechanical Arm

FIGS. 10A, 10B, 10C, and 10D illustrate a process of a mobile robot 900 opening a door 1010, according to one embodiment. FIGS. 10A through 10D illustrate example motions and operations that the robot 900 may perform to open the door 1010. Other methods of opening a door may include fewer, additional, or different motions and operations than those shown in these figures.

In the examples shown FIGS. 10A through 10D, the type of door being opened is a hinged door that opens towards the robot 900. However, the mobile robot 900 may also open doors of other types such as a hinged door that opens away from the robot 900, double sliding doors, rotating doors, and the like. Further, the door shown in FIGS. 10A through 10D has a turnable door knob. The mobile robot 900 may also open doors with other types of handles such as a lever handle, a crash pad, a handleset, and the like. In addition to opening doors, the robot 900 may also close the doors after opening and passing through the doors. The robot 900 may operate door locks such as a keypad, a padlock, a deadbolt, a thumb turn, a badge reader, and the like.

The robot 900 may receive navigation instructions to move from a current location to a target location from the central system 210, a security personnel 250, from another robot 900, or may autonomously decide to move to the target location, for instance as part of the performance of a security routine. The robot 900 moves via the motorized base 905 via instructions provided by a controller and selected based on the navigation instructions. Based on the navigation instructions, the robot 900 may generate a route from the current location to the target location based on one or more maps of an environment in which the robot 900 operates. The one or more maps may be stored in a memory within the robot 900 or accessed from the central system 210. The one or more maps may include floor plans that describes a layout of floor in a building and its premises and/or a semantic map that includes locations one or more objects, entities, or individuals, and that includes a meaning, description, identity, or status of the identified objects, entities, or individuals. Based on the one or more maps, the robot 900 may identify a presence of one or more doors along the route from the current location to the target location. In response to identifying the presence of a door, the robot 900 can approach the door and can initiate and perform the process of opening the door described herein.

As shown in FIG. 10A, the robot 900 approaches the door 1010. As the robot 900 approaches the door 1010, the robot 900 may access a semantic map and identify a type of the door 1010. Each door 1010 may be associated with information such as an orientation, a range of motion, an access list, security requirements, access history, and a type of door handle that is included in the one or more semantic maps. The robot 900 may also use one or more cameras in the camera system of the robot 900 to collect additional information about the door 1010. The robot 900 can collect image data of the door 1010 that is provided as input to an image recognition software, a neural network, a machine learning algorithm, and the like to identify the type of the door, the location of the door handle, the direction the door rotates to open, and to determine other features associated with the door 1010. For example, the image data may include an image of an access control system within a threshold distance of the door 1010. Based on the image data, the robot 900 may determine that the door 1010 requires access credentials.

Once the robot 900 is within a threshold distance of the door 1010, the robot 900 identifies a distance and a position of a door handle or knob from the mobile robot 900. The threshold distance can be a distance that is less than or equal to a span of the mechanical arm 930 such that the robot 900 can interact with the door handle or knob without moving the motorized base 905 closer to the door handle or knob. Once the robot 900 identifies the distance and the position of the door handle or knob and identifies a type of the door handle or knob, the robot 900 generates a motion plan that describes a set of motions to be performed to open the door 1010 by the moving components of the robot 900 such as the motorized base 910, the flippers 915, the rotatable ring 920, and the mechanical arm 925.

In one embodiment, the motion plan describes an overall magnitude and direction of force to be applied by the robot 900 associated with opening the door 1010. The motion plan may not specify how each of the individual components of the robot 900 is to move, but rather specifies an overall magnitude and direction of force to be applied to the door 1010. In another embodiment, the robot 900 may generate a set of instructions for driving each of the moving components such that a force of the magnitude in the direction described in the motion plan is applied.

In the example shown in FIG. 10A, the robot 900 may identify that the door 1010 is a hinged door and opens in a direction towards the robot 900. The robot 900 may receive image data collected by the camera systems of the robot 900 and/or semantic maps to determine the door handle type, door size, door material, access control system, door range of motion, and the like. Based on the received information, the robot 900 can determine that the door handle type is a door knob, and can determine a first force to apply to the door knob to open the door 1010 (e.g., a rotation force or torque to rotate the door knob).

The robot 900 can then determine a second force to apply to the door 1010 to cause it to rotate relative to the hinges of the door. The robot 900 can determine that the door knob is positioned on a left side and that the door hinges are positioned on a right side of the door 1010 and can determine that the second force should be directed towards the robot 900 and/or the door hinges. The second magnitude and the second direction may be based in part on access history of the door 1010 that are stored in the robot 900 or a collective access history maintained by the central system 210 of a plurality of robots 900 that have interacted with the door 1010 in the past. The magnitude of the second force may be based on a type of material of the door 1010. For example, if the robot 900 determines that a door is made out of wood, the robot may apply a force of a smaller magnitude than a door made out of metal which requires a greater force due to its greater weight. The magnitude of the second force may also be based in part on a type of door closer that is attached to the door 1010. For example, if the door closer has a spring, the robot may apply a force of a greater magnitude to the door 1010 compared to a door closer without a spring. Each robot 900 may be associated with a set of constraints on movements based on limitations of components of the robot. The set of constraints may be associated with a position of the components of the robot, direction of the motion, magnitude of force, and the like. If the constraints prevent the robot 900 from performing an action, the robot 900 may contact the central system and notify the central system that the robot 900 is incapable of performing the action. The central system may deploy another robot 900 that is capable of performing the action or dispatch security personnel to open the door.

It should be noted that in some embodiments, the direction and magnitude of the first force and second force can be default directions and magnitudes, can be selected based on the properties and orientation of the door and the door handle, can be manually entered, can be selected based on previous forces applied by the robot or other robots, or can be selected based on any other suitable criteria. In some embodiments, the direction and magnitude of the forces can be changed, increased, or decreased, for instance up to predetermined thresholds. For instance, if the robot 900 is unable to turn a handle in a first direction, the robot may try to turn the handle in a second direction. Likewise, if the robot 900 is unable to pull the door open, the robot may apply more force up to a predetermined threshold. Finally, if the robot 900 is opening the door, but the door is opening too quickly, the robot may decrease the force applied to ensure that the door opens at a safe speed.

To open the door shown in FIG. 10A, the robot 900 may grab the door handle using the mechanical hand 930. The mechanical hand 930 may have structures that function as fingers that can wrap around the door handle and apply the first force to turn the door handle to open the door 1010. The motion plan may specify a position of the mechanical hand 930 and the mechanical arm 925 with respect to the door handle when grabbing the door handle. The mechanical hand 930 may rigidly grab the door 1010 to turn the door handle and then loosen the grip after opening the door 1010 to allow more flexibility with future movement. The robot 900 may continue to apply the force to the door handle until the resistance of the door handle does not allow the robot 900 to apply additional force.

As shown in FIG. 10B, once the door is opened, the robot 900 may pull the door towards the robot body to open the door by applying the second force. Based on image data and information received from semantic maps, the robot 900 determines the second magnitude and the second direction required to rotate the door 1010 by a displacement that allows the entire robot 900 to pass through the rotated door 1010. Using the determined second magnitude and the second direction of the second force, the robot 900 determines a rotational angle and an angular acceleration for driving the rotatable ring 920 that allows the robot 900 to pull the door via the robot arm 925 wide enough for the robot 900 to pass through. If the determined magnitude of force is greater than a maximum force allowed based on constraints of the robot 900, the robot 900 may not apply the second force and notify the central system 210 instead to send another robot or security personnel to open the door 1010. This safety function can prevent accidents and damage to the robot 900 or the door 1010. In some embodiments, the robot 900 may first try applying the maximum force allowed by the constraints of the robot before notifying the central system 210.

Figure 10C:
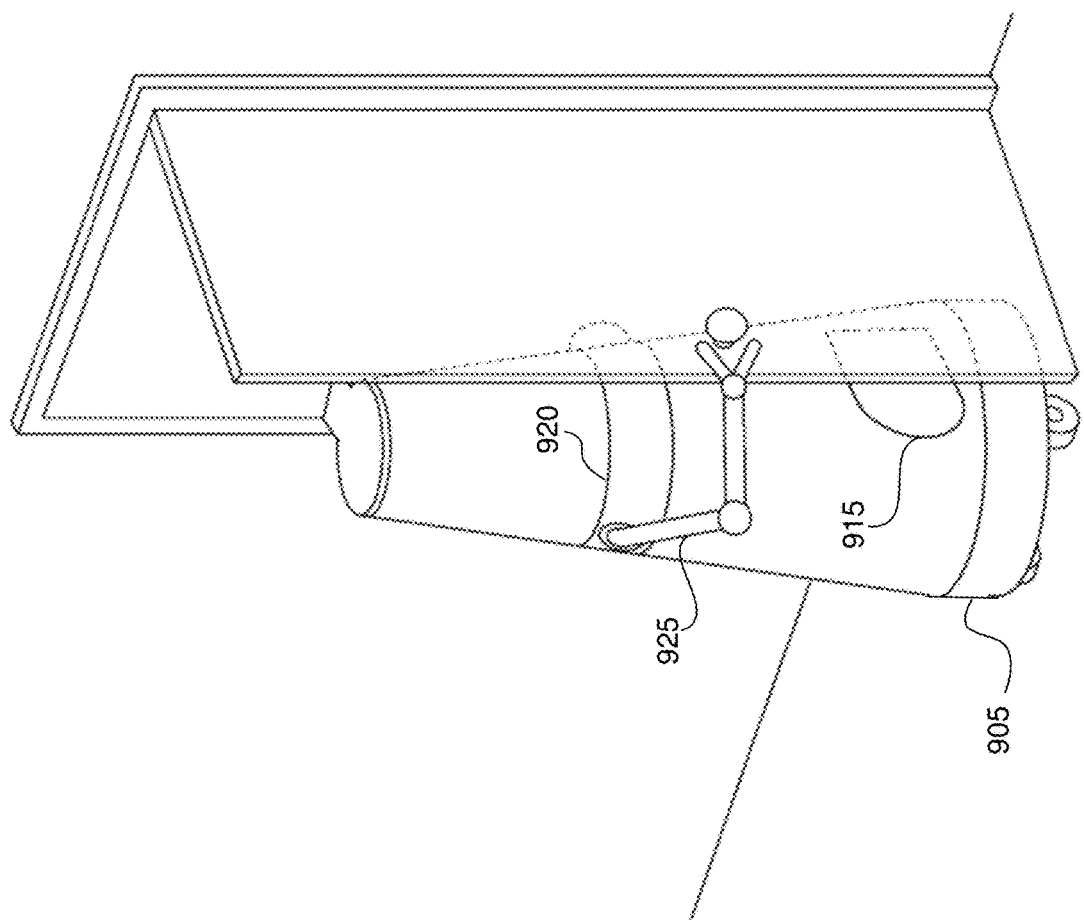
Figure 10D:
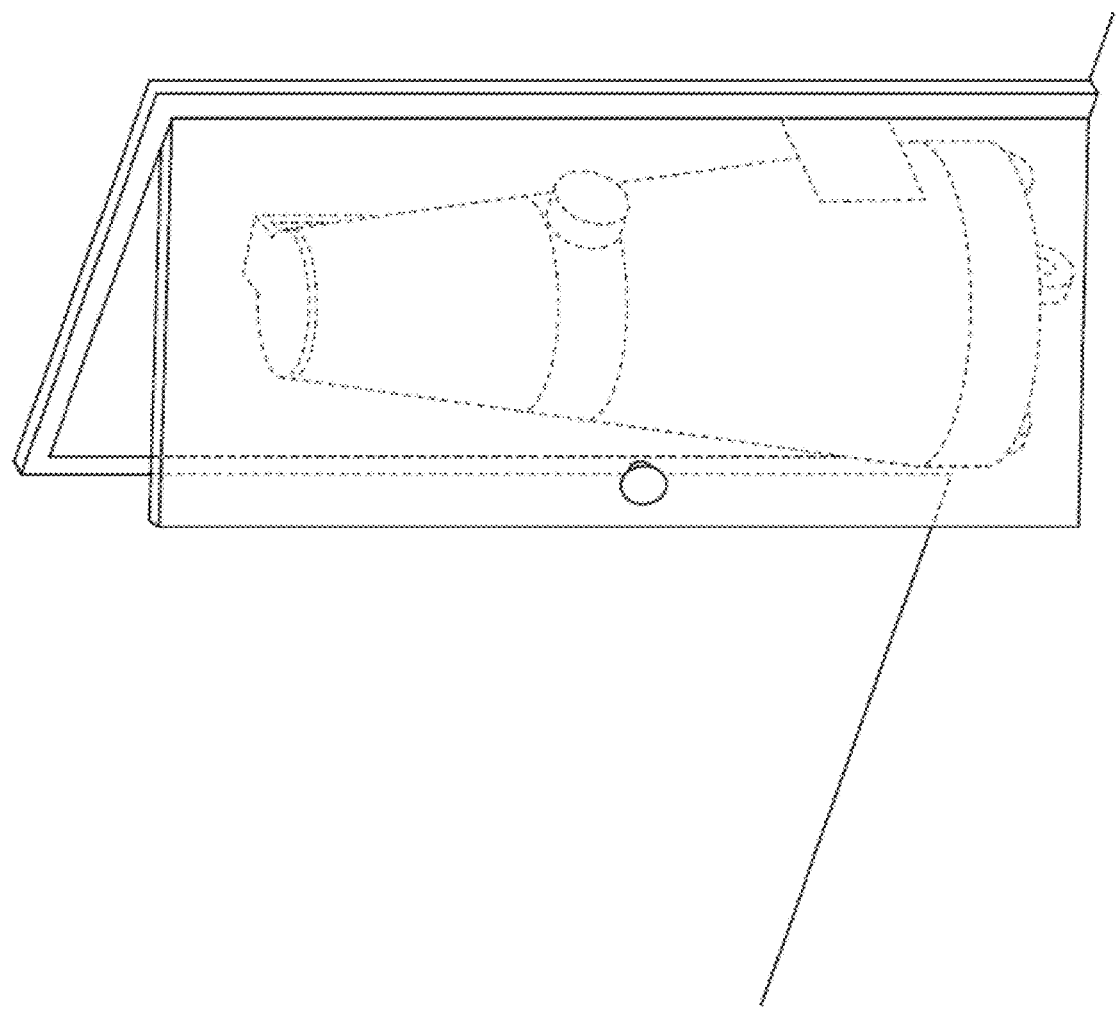

Once the door 1010 has rotated by the displacement that allows the robot 900 to pass through, the robot 900 moves towards the doorway. When the robot flippers 915 are within reach of the door 1010, the robot 900 may engage the flippers 915 to hold the door 1010 away from the rest of the robot 900 as the robot 900 moves through the door way. The flippers 915 may include rollers at the end of the flippers (not shown in FIGS. 10A-10D) that make contact with the door 1010 such that the flippers 915 do not damage a surface of the door 1010. In one embodiment, the flippers 915 are rigidly attached to the robot 900 and to engage the flippers 915, the robot 900 rotates the motorized base 905 such that the flippers 915 may make contact with the door 1010. In other embodiments, the flippers 915 are controlled by one or more motors that allows the flippers 915 to extend away from the robot body towards the door 1010. As the robot 900 moves through the door 1010, the flipper 915 may change position. As shown in FIG. 10B, the flippers 915 may initially be oriented such that the rounded edge points towards the doorway. However, as the robot moves further through the doorway, the flippers 915 may rotate relative to the robot such that the rounded edge continues to abut the door 1010. In some embodiments, the robot 900 may not have one or more flippers 915 and instead uses the motorized base 905 to hold the door 1010 open. The robot 900 may brush along the surface of the door 1010 and use the weight of the robot 900 to prevent the door 1010 from closing.

As the robot 900 passes through the door 1010, the robot 900 may cause the mechanical arm 925 to disengaged with the door handle and cause the rotatable ring 920 to rotate such that the mechanical arm 925 is on an opposite side of the robot 900 than the door 1010. For example, in FIG. 10C the rotatable ring is oriented such that a portion of the mechanical arm 925 and the mechanical hand 935 are on a first side of the robot adjacent to the door 1010. The robot 900 causes the rotatable ring 920 to rotate in a clockwise direction by an angular distance that causes the mechanical arm 925 and the mechanical hand 935 to be on a second side of the robot opposite the door 1010. This can prevent the mechanical arm 925 and the mechanical hand 935 from getting caught on an edge of the door 1010 as the robot 900 moves through the door way. In some embodiments, the rotatable ring 920 may rotate such that the mechanical arm 930 is at a rear portion of the robot (e.g., pointed behind the robot) instead of rotating all the way to the opposite side of the robot 900.

In some embodiments, the door 1010 is not spring loaded and remains open once the mechanical arm 925 rotates the door 1010 by the displacement required for the robot 900 to pass through. Once the robot 900 passes through the door 1010, the robot 900 may rotate the rotatable ring 920 such that the mechanical arm 925 may reach another door handle on a second side of the door and pull the door 1010 towards the robot 900 to close the door 1010. As discussed below in detail with respect to FIG. 14, the robot 900 may also test that the door 1010 is locked after closing the door 1010.

Although not shown in FIGS. 10A-10D, the door 1010 may be a door 1010 with a crash pad that lies horizontally along the door and become unlatched and rotates when a threshold amount of force is applied. The robot 900 may cause the rotatable ring 920 to rotate such that the mechanical arm 925 is placed in front of the robot 900 with respect to the robot body 940. The robot 900 may then cause the motorized base 905 to accelerate towards the door 1010 with the mechanical arm 925 extended towards the crash pad and to apply at least the threshold amount of force onto the crash pad.

After moving through the door 1010, the robot 900 may store the motion plan within the robot 900 or communicate the motion plan to the central system 210 such that the robot 900 may access the motion plan when opening the same door in the future. This may decrease response time of the robot 900 since the robot 900 does not have to perform real time analysis before opening the door 1010 in the future as well as save computation power.

Prior to opening the door 1010, the robot 900 may query one or more semantic maps to identify cameras that have visuals in a space behind the door 1010 or motion sensors that detect motion around the door 1010. In one embodiment, the robot 900 may access image data collected by the cameras or motion data collected by the motion sensors and verify that there are no obstructing objects or individuals on the other side of the door 1010. In another embodiment, the robot 900 may send a request to the central system to verify that it is safe for the robot 900 to open the door 1010. This verification step increases security and lowers risk of damage to the door 1010 as well as to obstructing objects and individuals on the other side of the door 1010.

Figure 11:
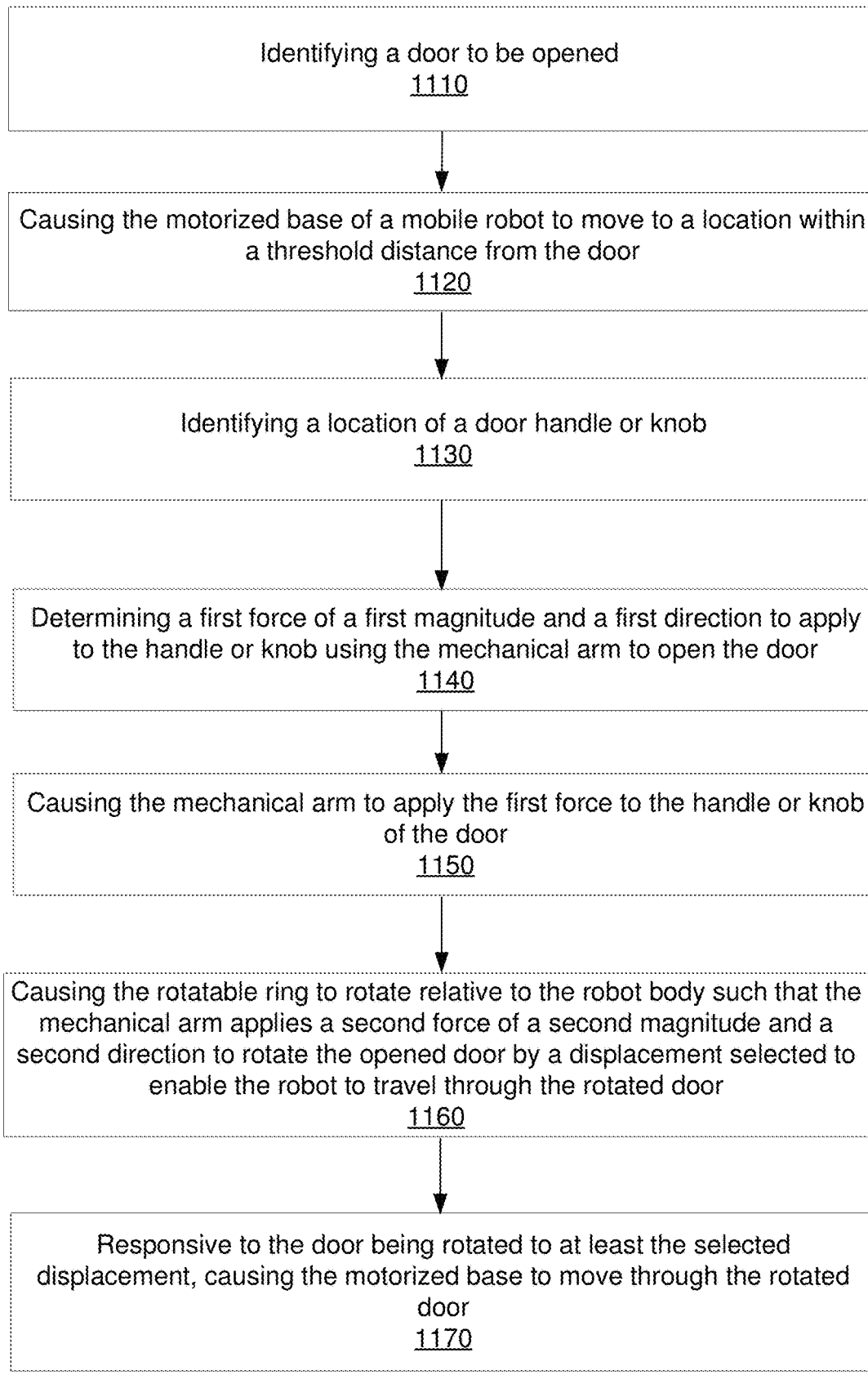
FIG. 11 is a flowchart describing a process of a mobile robot opening a door, according to one embodiment.

FIG. 11 is a flowchart describing a process of a mobile robot opening a door, according to one embodiment. In other embodiments, a robot may perform fewer, additional, or different steps to open a door than those described herein.

A controller of the mobile robot identifies 1110 a door to be opened. Once the door is identified, the controller causes the motorized base of the mobile robot to move 1120 to a location within a threshold distance from the door. The threshold distance may be determined based on a range of motion of a mechanical arm of the mobile robot, a radius of the door, a location of nearby obstacles or walls, and the like. When the mobile robot is at the location, the controller identifies 1130 a location of a door handle or knob.

The controller determines 1140 a first force of a first magnitude and a first direction to apply to the handle or knob using the mechanical arm to open the door. The first magnitude and the first direction may be based on a type of the handle or knob. The controller causes the mechanical arm to apply 1150 the first force to the handle or knob of the door to open the door.

The controller causes the rotatable ring to rotate 1160 relative to the robot body such that the mechanical arm applies a second force of a second magnitude and a second direction to rotate the opened door by a displacement selected to enable the mobile robot to move through the rotated door. Rotating the door by the selected displacement leaves enough space between a doorway and the door for the mobile robot to move through the rotated door. Responsive to the door being rotated to at least the selected displacement, the controller causes the motorized base to move 1170 through the rotated door. In some embodiments, as the mobile robot moves through, the controller may engage flippers to hold the door away from the mobile robot.

It should be noted that determining a first magnitude a first direction of the first force can include determining a force, magnitude, direction, position, and orientation of the entire rotatable arm, or for each component of the rotatable arm such that the aggregate force and direction of all arm components is substantially equivalent to the first magnitude and first direction of the first force. It should be likewise be noted that determining a second magnitude and a second direction of the second force can include determining a force, magnitude, direction, position, and orientation of the entire rotatable arm, or for each component of the rotatable arm such that the aggregate force and direction of all components is substantially equivalent to the second magnitude and second direction of the second force.

Taking an Elevator Using a Mechanical Arm

Figure 12A:
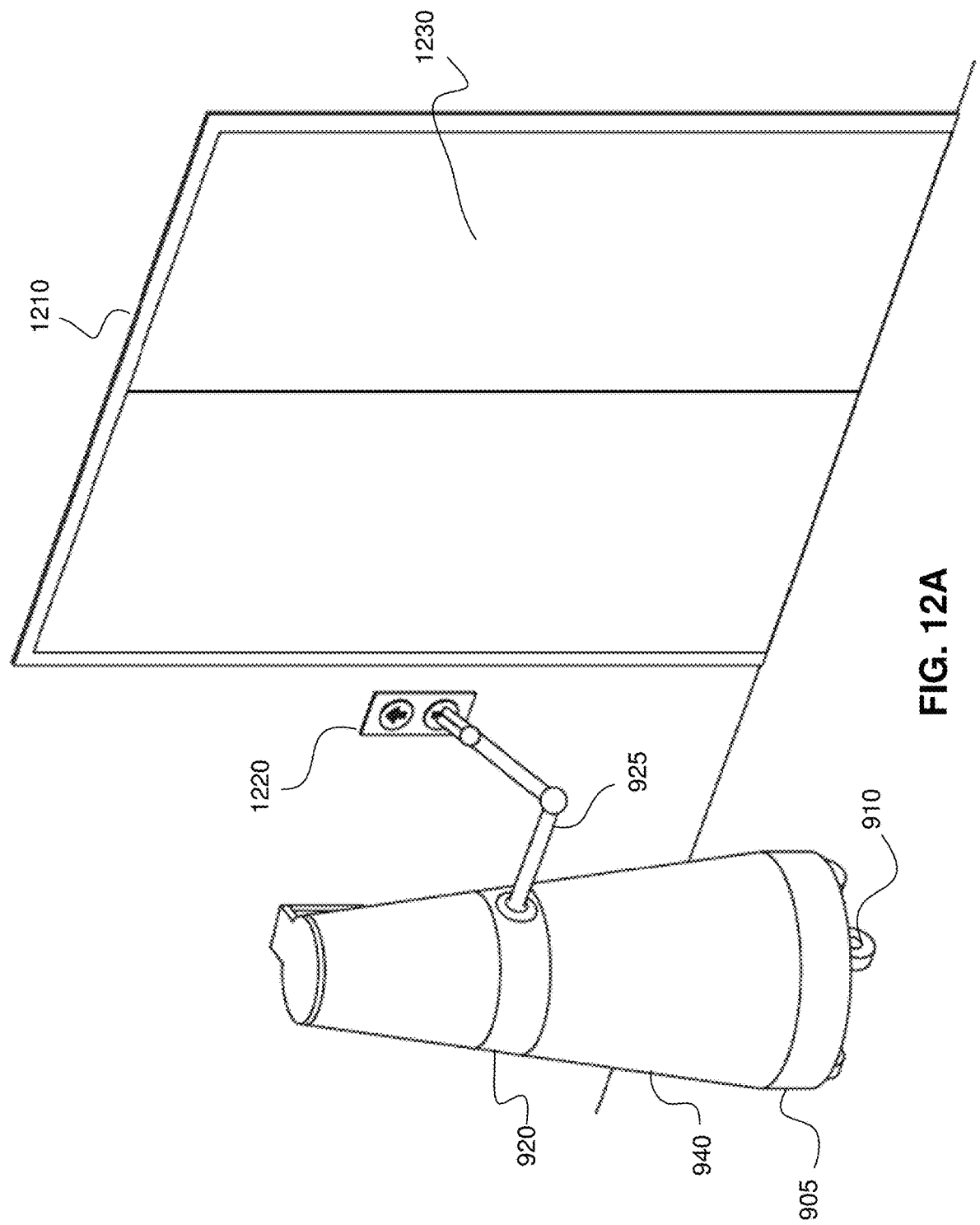
FIGS. 12A, 12B, and 12C illustrates a process of a mobile robot using an elevator, according to one embodiment.
Figure 12B:
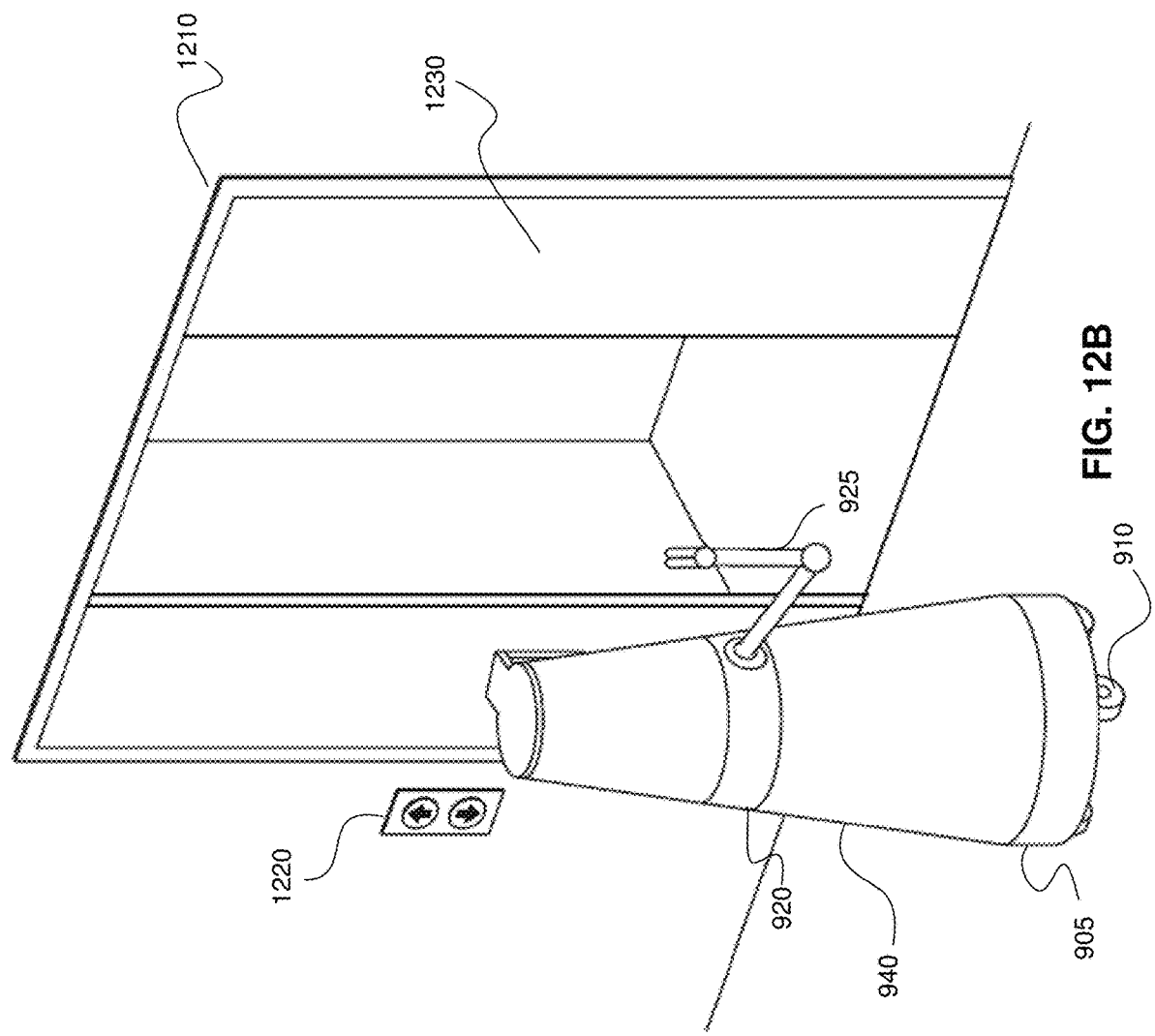
Figure 12C:
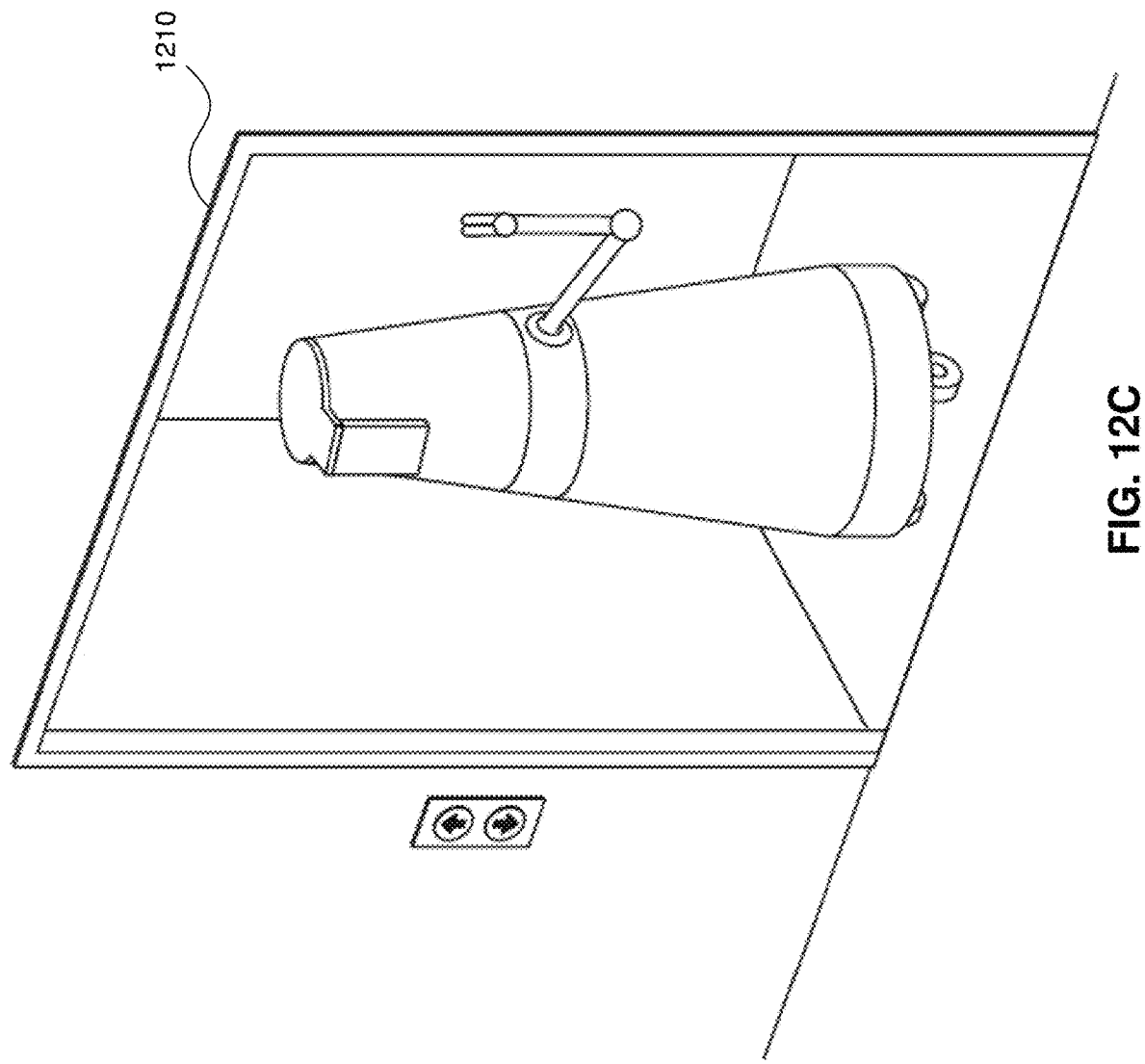

FIGS. 12A, 12B, and 12C illustrate a process of a mobile robot 900 using an elevator 1210, according to one embodiment. FIGS. 12A through 12C illustrate example motions and operations that the robot 900 may perform to use the elevator 1210. The robot 900 may perform fewer, additional, or different steps to use an elevator than those illustrated in FIGS. 12A-C according to the principles described herein.

The robot 900 may receive navigation instructions to go to a target floor that is different from a current floor of the robot 900, for instance from a remote security officer or as part of a security routine being implemented or performed by the robot. The robot 900 may be directed to move to a particular location on the target floor, to patrol the target floor, respond to an emergency on the target floor, and the like. The robot 900 identifies a location of an elevator, for instance using a floor map of a building, and moves via the motorized base 905 based on the navigation instructions to a location within a threshold distance from the elevator. The threshold distance may be based in part on a reach of the mechanical arm 925.

As shown in FIG. 12A, after moving to the location within the threshold distance from the elevator 1210, the robot 900 presses a button 1220 outside of the elevator 1210 to call the elevator 1210. There can be a plurality of buttons 1220 outside of the elevator 1210 that represent the directions that the elevator can move (e.g., up, down) and the robot 900 determines which of the plurality of buttons 1220 to press based on the location of the target floor relative to the current floor. For instance, the robot 900 can compare a value associated with the current floor of the robot 900 to a value associated with the target floor and select the button 1220 based on the comparison. In one example, the robot is currently on the fifth floor, which is associated with a value of 5, and a target floor is a first floor of an underground parking garage, which is associated with a value of −1. Since the target floor is associated with a value less than a value of the current floor, the robot 900 can select the button 1220 associated with the downward direction. In another example, the robot is currently on the first floor of the underground parking garage and the target floor is the fifth floor. Since the target floor is associated with a value greater than a value of the current floor, the robot 900 can select the button 1220 associated with the upward direction.

In some embodiments, the elevator 1210 is associated with an access control system outside of the elevator 1210 that requires access credentials (such as a key fob, an identity card, or an RFID-enabled object) before being able to press the button 1220 for calling the elevator 1210. The robot 900 may identify a location of the access control system and moves to a threshold distance from the access control system. The robot 900 can then present access credentials for access to the elevator 1210. To present the access credentials, the robot 900 may rotate the rotatable ring 920 to a particular position with respect to the robot body 940 to put the mechanical arm 925 in position for presenting the access credentials. In one embodiment, the robot 900 may be remotely connected to the access control system via the network 200 and present the access credentials wirelessly and/or without physical interaction with the access control system.

Once the robot 900 determines the button 1220 or buttons 1220 to press, the robot 900 generates a motion plan for the rotatable ring 920 and the mechanical arm 925. The robot 900 can use the camera system with one or more cameras on the robot 900 to receive image data for determining a position of the selected button 1220. Based on the determined position, the robot 900 determines a current position of the mechanical arm 925 with respect to the robot body 940 and determines a target position relative to the robot body 940 to put the mechanical arm 925 in position to press the selected button 1220. In one embodiment, the robot 900 has a depth camera on the mechanical arm 925 used to determine how far the mechanical arm 925 is from the selected button 1220 as the mechanical arm 925 moves towards the selected button 1220, which allows for precise and accurate movement of the arm.

After pressing the button 1220, the robot 900 moves to a location in front of the elevator doors 1230. In some embodiments, the robot 900 may align the wheels 910 to be perpendicular to the elevator doors 1230. Aligning the wheels 910 to be perpendicular can reduce the probability of the wheels 910 accidentally getting caught in a space between building floors and elevator cabins. The robot 900 may iteratively move backwards and forwards until the wheels 910 are positioned appropriately for entering the elevator 1210, or may rotate in place until the wheels are aligned.

As shown in FIG. 12B, the robot 900 detects when the elevator doors 1230 open. The robot 900 may use one or more sensors and/or cameras to detect that the elevator doors 1230 are moving. For example, the robot 900 may have a motion detection sensor that detects the movement of the elevator doors 1230. The robot 900 may also receive image data of the surrounding environment and use image detection to determine that the elevator doors 1230 are open. Once the elevator doors 1230 are fully open, the robot 900 analyzes the inside of the elevator to determine whether there is enough space for the robot 900 to enter the elevator.

Prior to entering the elevator 1210, the robot 900 determines if the elevator 1210 is going in a direction associated with the selected button 1220. For example, if the robot 900 called an elevator 1210 going down, the robot 900 should not enter an elevator 1210 that is going up. The robot 900 may determine a direction associated with the elevator 1210 based on indicators such as an audio output from the elevator 1210, a light on the selected button 1220 turning off responsive to the elevator 1210 doors opening, a light indicator indicating an elevator direction above the elevator 1210, and so forth.

The robot 900 may receive image data of the inside of the elevator using cameras included in the robot 900 as well as cameras installed in the elevator or on the current floor with visibility into the elevator. In some embodiments, the robot 900 may communicate with the central system to receive image data of the elevator 1210 from one or more cameras that are installed within the elevator 1210 and the building. In some embodiments, one or more sensors in the elevator 1230 may keep track of the number of individuals that enter and leave the elevator 1210 and a total weight within the elevator 1230. The robot 900 determines a number of individuals in the elevator 1210 and compares the determined number to a maximum occupancy of the elevator 1210. If the determined number is equal to or exceeds the maximum occupancy, the robot 900 does not enter and instead waits for a next elevator 1210.

The robot 900 determines a target location in the elevator 1210. Based at least in part on the image data received from cameras on the robot 900 and/or cameras installed within the elevator 1210, the robot 900 identifies one or more open locations in the elevator 1210. The image data may specify locations of one or more individuals and objects that are already in the elevator 1210. The one or more open locations each correspond to a section of the elevator 1210, where each section has at least an area greater than the area of the motorized base 905 of the robot 900. The one or more open locations do not have any individuals or objects in the area associated with the open locations. If there are no open locations in the elevator 1210, the robot 900 waits for a next elevator 1210. Once determining that there are no open locations, the robot 900 can wait until the elevator doors 1230 are completely closed. When the elevator doors 1230 are completely closed, the robot 900 can cause the mechanical arm 925 to press the button 1220 outside of the elevator 1210 again to call another elevator 1210.

In some embodiments, there may be a plurality of open locations in the elevator 1210 that the robot 900 can select as the target location. The robot 900 can select one of the plurality of open locations based on future movement. The robot 900 may determine a distance between each of the plurality of open locations to a reference location such as a panel of buttons in the elevator 1210 or the elevator doors 1230. In one example, the robot 900 may select an open location that is closest to the elevator doors 1230 as the target location because it is easier for the robot 900 to move to the target location and exit from the target location. Alternatively, the robot 900 may select an open location that is closest to the panel buttons so that the robot can quickly select a floor button, and can subsequently move to a different open location within the elevator (for instance, to allow people within the elevator to have access to the panel buttons, or to position the robot to easily exit the elevator when the elevator arrives at the target floor). In other embodiments, the robot 900 may select an open location further away from other elevator passengers.

Once the target location is selected, the robot 900 generates a motion plan for the motorized base 905 to move the robot 900 to the target location. As discussed above, the robot 900 may align the wheels 910 to be perpendicular with the elevator doors 1230 such that the wheels 910 of the robot 900 do not get stuck in the space between the floor and the elevator cabin as the robot 900 enters. Further, the robot 900 may move into the elevator 1210 with at least a first threshold velocity to reduce the possibility of the wheels 910 getting stuck, but below a second threshold velocity to reduce the risk of the robot running into an elevator passenger. In some embodiments, the speed that the robot moves (both with regards to an elevator and in regards to other types of movement described herein) is lower when people are visible to or within a threshold distance of the robot than when the robot is moving without people nearby.

The robot 900 enters the elevator 1210 and moves to the target location. In one embodiment, once the robot 900 enters the elevator 1210 and moves to the target location, the robot 900 may rotate 180 degrees such that the robot body 940 faces the elevator doors 1230, as illustrated in FIG. 12C. By rotating 180 degrees after entering the elevator, the robot 900 is better able to exit the elevator without subsequent rotation or re-orientation. In another embodiment, the robot 900 does not rotate after entering the elevator 1210 and remains in the orientation in which the robot 900 entered. By not rotating in the elevator 1210, the robot 900 can maintain the perpendicular alignment of the wheels 910 and avoid accidentally making contact with individuals in the elevator 1210 or objects in the elevator 1210.

After entering the elevator 1210 and moving to the target location, the robot 900 presses a button inside the elevator 1210 associated with the target floor. The robot 900 may use an image recognition software to determine numbers, letters, and characters associated with the buttons that represent various floors of the building. The elevator 1210 may have a panel of buttons in the elevator 1210 including buttons associated with floors as well as buttons for opening and closing the elevator doors 1230, calling for help in a case of emergency, and sounding an alarm in a case of emergency. The robot 900 determines a location of the button associated with the target floor from the panel of buttons with respect to the mechanical arm 925. Based on the location, the robot 900 generates a motion plan for the mechanical arm 925 to press the button. The motion plan can include instructions for the rotatable ring 920 to move the mechanical arm 925 to a position relative to the robot body 940 that allows the mechanical arm 925 to reach and press the button. In some embodiments, the elevator 1210 may include an access control system inside the elevator 1210 that requires access credentials before pressing the button associated with the target floor. The robot 900 may move to a location within a threshold distance from the access control system in the elevator 1210 and present the access credentials to the access control system. The robot 900 may rotate the rotatable ring 920 and move the mechanical arm 925 to present the access credentials. Once access is granted, the robot 900 implements the motion plan by rotating the rotatable ring 920 to a position identified by the motion plan and by extending the mechanical arm 925 as identified by the motion plan to press the button associated with the target floor. In some embodiments, the motion plan further identifies a movement for the motorized base 905 to press the button, and then causes the robot 900 either to stay in a current location or to return to a target location within the elevator 1210.

In one embodiment, if there is at least one individual in the elevator 1210, the robot 900 requests that the individual press the button associated with the target floor instead of moving the mechanical arm 925 to press the button. The robot 900 may generate an audio output specifying the target floor (e.g., "please press the button for the $3^{rd}$ floor"). In another embodiment, the robot 900 may compare a distance between the robot 900 and the button to a distance between the individual and the button and request that the other individual press the button if the distance between the robot 900 and the button is greater than the distance between the individual and the button. In some embodiments, the robot 900 may communicate with the central system that sends instructions to the elevator 1210 to stop at the target floor without manual interaction with the button.

As the elevator 1210 moves up or down floors, people may enter and leave the elevator 1210. The robot 900 may update the target location within the elevator 1210 based on movement of the people entering and leaving the elevator 1210. For example, if a current location of the robot 900 within the elevator 1210 is near the elevator door 1230, and a person that is standing in a location near the back of the elevator 1210 exit the elevator, the robot 900 may update the target location to the location near the back of the elevator 1210. This allows future passengers of the elevator 1210 to enter the elevator 1210 more easily. In some embodiments, the robot 900 can leave the elevator altogether to let someone off the elevator, and can re-enter the elevator after the person has left.

While the robot 900 is in the elevator 1210, the robot 900 may lose connection to the central system (or may lose wifi or wireless coverage), which prevents the robot 900 from receiving navigation instructions and updated information associated with the surrounding environment. In one example, when the robot 900 loses connection to the central system, the robot 900 may generate an updated motion plan to exit the elevator 1210 at a next instance of the elevator doors 1230 opening. In another example, the robot 900 can also select a default floor (e.g., lobby) after losing connection. In addition, the robot 900 may travel to the target floor, may leave the elevator after arriving at the target floor, and may attempt to re-establish a communicative connection once off the elevator.

The robot 900 may receive image data inside the elevator 1210 and determine a floor at which the robot 900 is exiting. For example, the robot 900 may receive an image of a display (e.g., segment display, LCD, LED, and the like) within the elevator 1210 that shows a current floor of the elevator 1210. The robot 900 may also use wireless fingerprinting (e.g., RFID tags, communication with specific access control systems, or WiFi fingerprinting) to determine which floor the elevator car is stopped at. In another embodiment, the robot 900 may exit the elevator 1210 without determining a current floor. After exiting the elevator 1210, the robot 900 collects information about the current floor using one or more sensors and cameras on the robot 900. The robot 900 may access one or more semantic maps that include information about floors of a building that is accessible by the elevator 1210 and compare the collected information to the information in the one or more semantic maps. For each of the floors of the building, the robot 900 may determine a score that indicates a similarity between the collected information and the information stored in the one or more semantic maps. Based on the determined scores, the robot 900 may select a floor that has a highest score as the current floor. The robot 900 may also collect real-time data while riding the elevator 1210 using sensors such as an altimeter or an accelerometer in order to determine a current floor of the elevator.

The robot 900 may detect unusual movement while in the elevator 1210. For example, the robot 900 may detect sudden up and down movement or an extended period of no movement and determine that the elevator 1210 is not operating regularly. During an emergency while in the elevator 1210, the robot 900 may generate a motion plan to select one or more buttons associated with emergencies. For example, the robot 900 may identify a location of an alarm button or a call button and cause the rotatable ring 920 to place the mechanical arm 925 in position to press the alarm button or the call button. The robot 900 may generate an audio output that describes the emergency after being connected to safety personnel and request for help. The robot 900 may also attempt to communicate with the central system to notify the central system about the emergency.

When the robot 900 arrives at the target floor, the robot 900 may identify the opening of the elevator doors 1230. In a similar manner to entering the elevator 1210, the robot 900 may move backwards and forwards within the elevator 1210 to align the wheels 910 to be perpendicular to the elevator doors 1230, and may exit the elevators 1210 at a speed sufficient to reduce the risk of getting stuck within the elevator threshold. In some embodiments, the robot 900 waits for other elevator passengers to exit before leaving the elevator.

Figure 13:
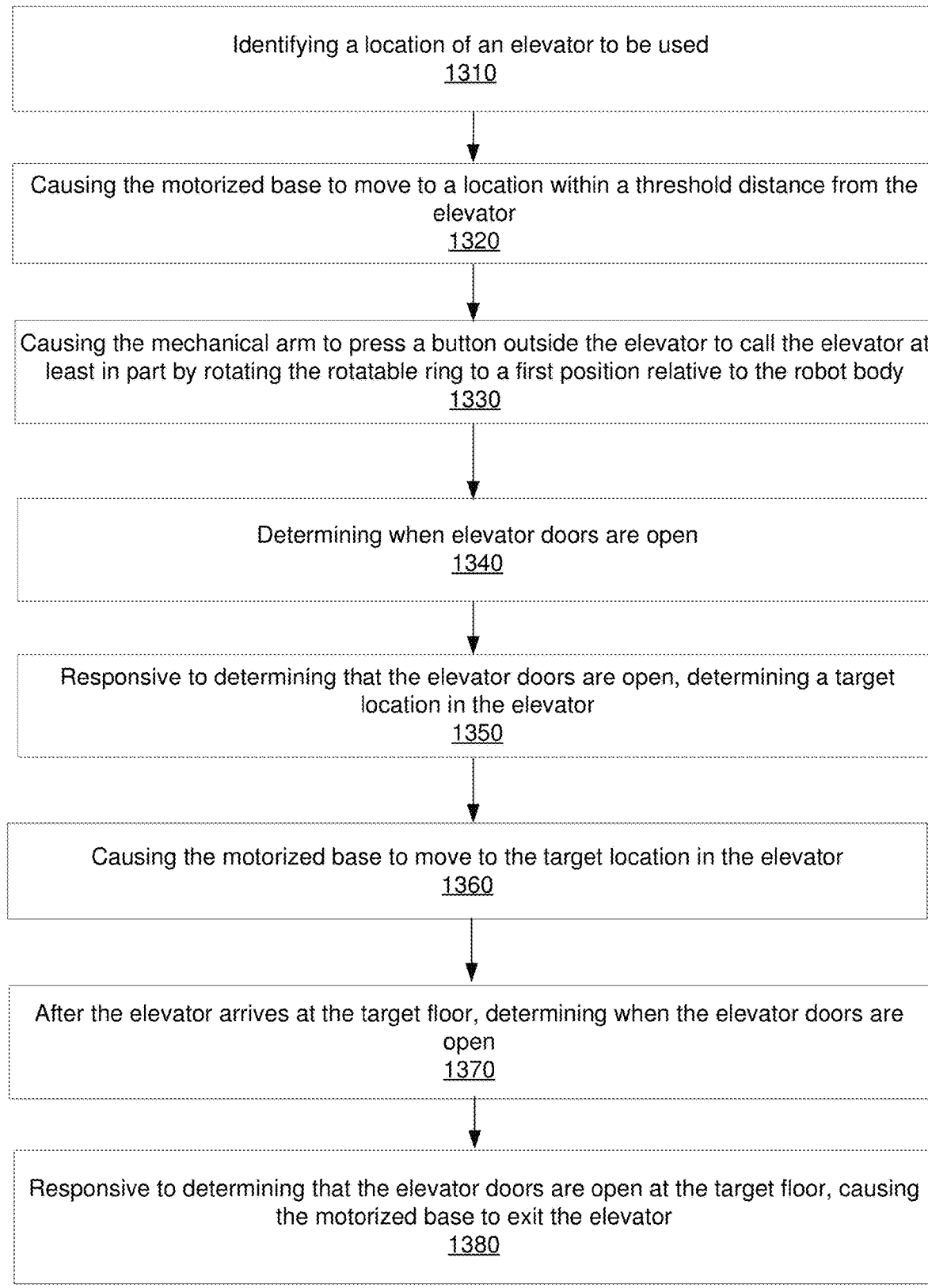
FIG. 13 is a flowchart describing a process of a mobile robot using an elevator, according to one embodiment.

FIG. 13 is a flowchart describing a process of a mobile robot using an elevator, according to one embodiment. In other embodiments, a robot may perform fewer, additional, or different movements or operations than illustrated in FIG. 13 according to the principles described herein.

A controller of the mobile robot identifies 1310 a location of an elevator to be used within a building floor. The controller may query maps that describe a layout of a building, floor, or site that the elevator is in and/or query semantic maps of a surrounding environment to identify the location of the elevator. After identifying the location of the elevator to be used, the controller causes the motorized base to move 1320 to a location within a threshold distance from the elevator.

When the motorized base is at the location within the threshold distance from the elevator, the controller causes the mechanical arm to press 1330 a button outside the elevator to call the elevator at least in part by rotating the rotatable ring to a first position relative to the robot body. The controller identifies the location of the button outside the elevator relative to the mobile robot and generates a motion plan for the rotatable ring and the mechanical arm to press the button. The controller then moves the rotatable ring and the mechanical arm according to the steps identified within the motion plan in order to press the button.

After pressing the button, the controller waits for the elevator to arrive at a current floor of the mobile robot. The controller determines 1340 when elevator doors are open. Responsive to determining 1350 that the elevator doors are open, the controller determines a target location in the elevator, where the target location has enough space for the mobile robot to move to and occupy. The controller causes the motorized base to move 1360 to the target location in the elevator, taking care to avoid other passengers within the elevator.

While the mobile robot is in the elevator, the controller determines when the elevator arrives at the target floor. After the elevator arrives at the target floor, the controller determines 1370 when the elevator doors are open. Responsive to determining that the elevator doors are open at the target floor, the controller causes 1380 the motorized base to exit the elevator.

Determining a Lock State of a Door Using a Mechanical Arm

Figure 14:
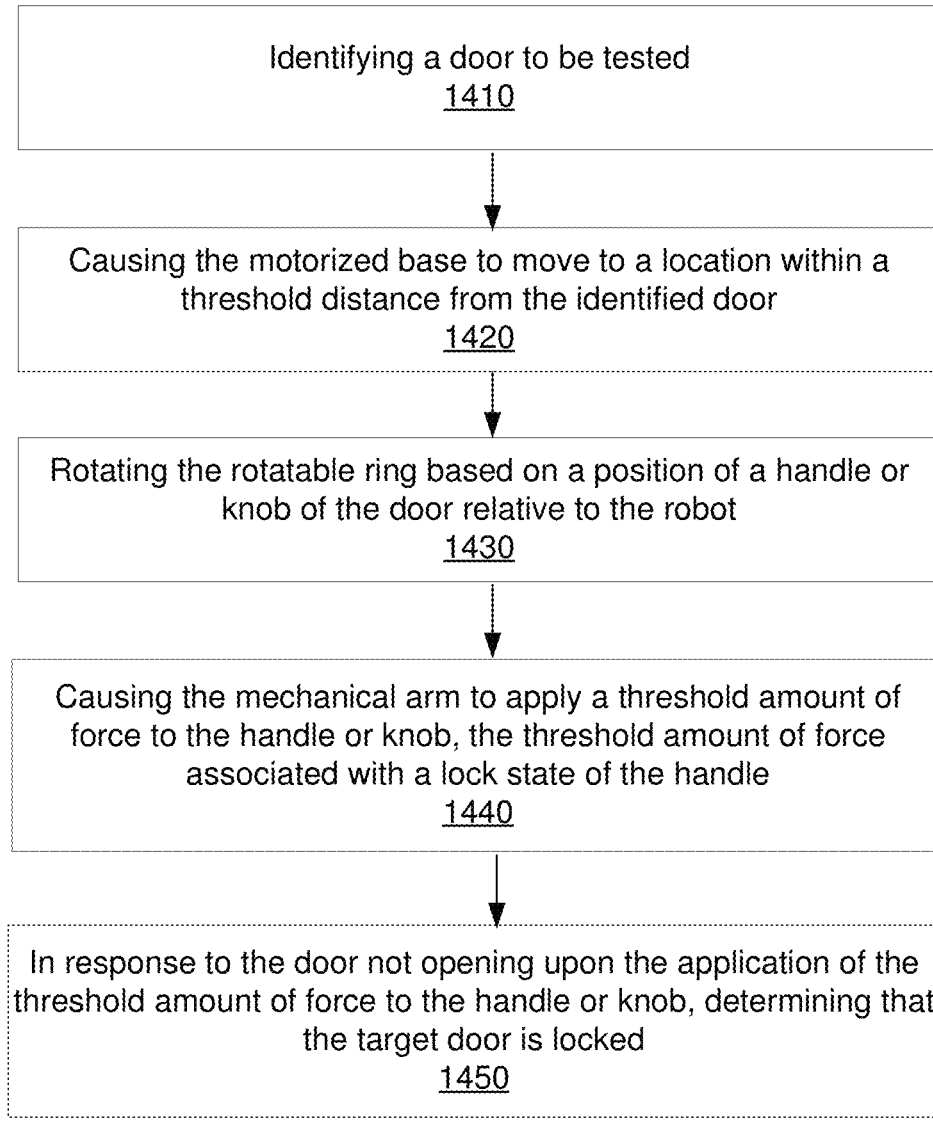
FIG. 14 is a flowchart describing a process of a mobile robot checking whether or door is locked, according to one embodiment.

FIG. 14 is a flowchart describing a process of a mobile robot 900 checking whether a door 1010 is locked, according to one embodiment. The robot can perform fewer, additional, or different movements or operations to determine if a door is locked than those illustrated in FIG. 14 according to the principles described herein.

The mobile robot 900 communicates with a central system that sends navigation instructions and requests to perform certain operations to a controller of the robot 900. The controller may receive instructions to test whether a specific door is locked or unlocked, or may test one or more doors within an area while performing routine patrols or implementing security protocols within a building. For example, the robot 900 may be configured to move through one or more floors of the building, checking that each of the doors on the one or more floors is locked when they are supposed to be (e.g., during after-hours of the building).

A controller of the mobile robot 900 identifies 1410 a door 1010 to be tested. The controller may identify the door 1010 based on information received from sensors and/or cameras on the robot 900. The controller may also identify a door 1010 to be tested by accessing one or more semantic maps associated with a current location of the robot 900 that identify locations of doors within a floor of a building or within a threshold distance of the robot, accessing cameras within a threshold distance of the current location of the robot that are installed in the building in order to identify nearby doors within images or videos of the cameras, accessing historical data of actions performed by the mobile robot 900 and other mobile robots connected to the network 200 with regards to doors, and the like.

As shown in FIG. 10A, the controller causes 1420 the motorized base 905 to move to a location within a threshold distance from the identified door 1010. The threshold distance may be based on a reach of the mechanical arm 925, a range of motion of the mechanical arm 925, a type of the identified door 1010, and a type of the door handle or knob.

Once the motorized base is at the location within the threshold distance from the identified door 1010, the controller rotates 1430 the rotatable ring 920 based on a position of a handle or knob of the door relative to the robot. The mechanical arm 925 is coupled to the rotatable ring 920, and by causing the rotatable ring 920 to rotate, the mechanical arm 925 may be positioned for applying a force to the handle or knob of the door 1010 to test if the door 1010 is locked. The controller can generate a motion plan for the rotatable ring 920 and the mechanical arm 925 that specifies movement of the rotatable ring 920 and the mechanical arm 925 to test the identified door.

The controller causes 1440 the mechanical arm 925 to apply a threshold amount of force to the handle or knob, the threshold amount of force associated with a lock state of the handle or knob. The controller may query a semantic map that includes information on the door 1010, where the semantic map identifies the type of handle or knob and threshold amount of force associated with the type of handle or knob for the particular door 1010. The controller may cause the mechanical arm 925 to apply an initial force to the handle or knob, where the initial force is smaller in magnitude than the threshold amount of force. After applying the initial force, the controller can cause the mechanical arm 925 to increase the amount of force applied to the handle or knob in predetermined increments until the force reaches the threshold amount of force. By slowly increasing the amount of force applied to the handle or knob instead of applying it at once, the controller can reduce the risk of damaging the door and the mechanical arm 925.

After applying the threshold amount of force to the handle or knob, the controller determines whether the door 1010 opens. In response to the door 1010 not opening upon the application of the threshold amount of force to the handle or knob, the controller determines 1450 that the target door 1010 is locked. The controller may update a status of the door 1010 in a semantic map or a building or security database to specify that the door 1010 is locked. The controller may update additional information such as a time at which the test was conducted. The controller may repeat applying the threshold amount of force to the handle or knob to doublecheck that the door 1010 is locked. For example, if the door 1010 has a door knob, the control may cause the mechanical arm 925 apply the threshold amount of force in a clockwise direction to the door knob and then cause the mechanical arm 925 to apply the threshold amount of force in a counterclockwise direction to the door knob, and repeat the turning the door knob in both directions several times to simulate "jiggling the handle" for further verification.

If the controller determines that the door 1010 opens upon the application of the threshold amount of force to the handle or knob, the controller may access a key to lock the door 1010. The key may be a pin entered to a security system, a physical key, and such. To lock the door 1010, the controller can cause the rotatable ring 920 to rotate relative to the robot body to enable the mechanical arm 925 to be in position to lock the door 1010. Alternatively, the controller can communicate with the central system 210 to send a request for a security personnel 250 or another robot 900 to lock the door 1010. While the robot 900 waits for the security personnel 250 or the other robot 900, the robot 900 may move to a location within a threshold distance of the door 1010 to prevent unauthorized individuals from passing through the door 1010. The robot 900 may identify individuals approaching the door 1010, and when one or more individuals are by the door 1010, the robot 900 may request the one or more individuals to present access control credentials for the door 1010. The robot 900 may have a built-in access control system configured to determine whether the access control credentials presented by the individuals meet one or more security requirements for the door 1010. The robot 900 may also receive the access control credentials and communicate information associated with the access control credentials to the central system 210 with a request to determine whether the one or more individuals should be allowed through the door.

When the robot 900 determines that the one or more individuals meet the requirements, the robot 900 may move away from the door 1010 to allow the one or more individuals to pass through. On the other hand, when the robot 900 determines that the one or more individuals do not meet the requirements, the robot 900 may move in front of the door to prevent the one or more users from passing through. The robot 900 may also contact the central system 210 to notify the security personnel that there has been an attempt for unauthorized entry of the door 1010. The notification to the central system 210 may include identifying information associated with the one or more users and a time stamp at which the attempts to enter the door 1010 were made.

The robot 900 may check that a door 1010 is not only locked, but also properly latched. The handle or knob may be in a lock state, but if the door 1010 is not latched, the door 1010 may be still be rotated by pushing or pulling the door 1010. After checking the lock state of the handle or knob, the robot 900 may apply another force on the door 1010 in a direction that can cause the door to rotate or otherwise open to check if the door 1010 is latched. For example, the door shown in FIG. 10A is a door 1010 that swings towards the robot 900 in a counterclockwise direction with respect to the door hinge. The controller may cause the mechanical arm 925 to pull the handle or knob towards the robot body 940 to test if the door 1010 rotates or opens. If, in response to this force, the door does not rotate, the controller may update a semantic map or a building or security database that the door 1010 is latched. However, if the door 1010 rotates with the other force, the robot 900 may apply a force in an opposite direction to close and latch the door 1010. After applying a force to close the door 1010, the robot 900 may repeat the test to see if the door has latched, and if the test fails again, the robot 900 may contact a central system to notify that the door 1010 requires maintenance. The robot 900 may also update a semantic map indicating that the door 1010 is broken.

The robot 900 may test an access control system of the door 1010 using improper access control credentials and proper access control credentials. The robot 900 may present the improper access control credentials to the access control system and then cause the mechanical arm 925 to apply the threshold amount of force for testing to the handle or knob. If the door 1010 remains locked responsive to the threshold amount of force being applied, the robot 900 determines that the access control system is functioning properly. However, if the door 1010 opens responsive to the threshold amount of force despite using the improper access control credentials, the robot 900 determines that the access control system is not working properly. The robot 900 may send a request to the central system for maintenance of the door. The robot 900 may also update the semantic map to include a status of the door 1010 that specifies that the door 1010 is broken.

The robot 900 may also present proper access control credentials to the access control system and then cause the mechanical arm 925 to apply the threshold amount of force to the handle or knob. If the door 1010 opens, the robot 900 determines that the access control system is working properly. In some embodiments, a central system may store an access history of the door for security reasons. After presenting the proper access control credentials, the robot 900 may communicate with the central system to determine if the access control system is accurately updating the access history responsive to presenting the access control credentials. The robot 900 may determine a timestamp at which the access control credentials were presented to the access control system and compare the timestamp to an entry associated with the mobile robot 900 in the access history. When the timestamp does not match the entry in the access history, the robot 900 may update that the access control system is broken. Also, if the door 1010 remains locked responsive to the threshold amount of force being applied to the door handle or knob after presenting proper access control credentials, the robot 900 may determine that the access control system is not working properly.

In some embodiments, the door 1010 may be associated with an automatic door opening button that opens the door when the automatic door opening button is pressed without force being applied to the door 1010. The controller can cause the motorized base to move to a location within a threshold distance of the automatic door opening button and cause the rotatable ring 920 to rotate to a position for the mechanical arm 925 to press the automatic door opening button. After pressing the automatic door opening button, the robot 900 may determine whether the door 1010 is opening. If the door 1010 does not open, the robot 900 may update a status of the door in the semantic map that the automatic door opening button is broken. The robot 900 may also notify the central system for maintenance and/or update the semantic map to include a status of the door 1010 that specifies that the automatic door opening button is broken.

Summary

It should be noted that in various embodiments described herein, data captured by a robot can be stored and used for future machine-learning applications, to trained prediction models, to enable accountability (e.g., providing auditable logs), and the like. Some or all of this captured data can be provided to customers to enable customer-initiated analysis and auditing. This captured data can further be used to enhance various functions described herein, for instance by strengthening a semantic map (by including more detail within the map).

It should also be noted that although much of the functionality described herein is in reference to the performance of one or more security operations and functions, any type of operation or function can be performed and enabled, for instance facility operations, ES&H operations, and the like.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like, for instance, within a robot or robot system. Furthermore, it has also proven convenient at times, to refer to these arrangements of operations as modules or engines, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Further, the functionalities described herein can be performed by a hardware processor or controller located within the robot.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A mobile robot comprising:
a motorized base configured to move the mobile robot within an environment;
a body on the motorized base comprising a rotatable ring configured to rotate horizontally around the robot body and a mechanical arm extendible from the rotatable ring; and
a controller configured to:
identify a door to be tested;
cause the motorized base to move to a location within a threshold distance from the identified door;
determine if the identified door is locked by:
rotating the rotatable ring based on a position of a handle or knob of the door relative to the mobile robot;
causing the mechanical arm to apply a threshold amount of force to the handle or knob by applying an initial amount of force to the handle or knob and increasing the applied force in predetermined increments or gradually until the applied force is equal to the threshold amount of force, the threshold amount of force associated with a lock state of the handle; and
responsive to the door not opening upon the application of the threshold amount of force to the handle or knob, determining that the door is locked; and
responsive to determining that the identified door is locked, determine if the identified door is latched by:
determining a magnitude of force to apply to the door to check if the door is latched;
causing the mechanical arm to apply the magnitude of force in a direction associated with opening the door; and
responsive to the door not opening upon application of the force to the door, determining that the door is latched.

2. The mobile robot of claim 1, wherein the controller is further configured to:
responsive to determining that the door is locked, update a status of the door in a semantic map to specify that the door is locked.

3. The mobile robot of claim 1, wherein the threshold amount of force associated with the lock state of the handle is retrieved from a semantic map.

4. The mobile robot of claim 1, wherein the controller is further configured to:
identify a second door to be tested;
cause the motorized base to move to a location within a threshold distance from the second door; and
determine if the second door is locked by:
rotating the rotatable ring based on a position of a second handle or knob of the second door relative to the mobile robot;
causing the mechanical arm to apply a second threshold amount of force to the second handle or knob, the second threshold amount of force associated with a lock state of the second handle or knob; and
responsive to the second door opening upon the application of the second threshold amount of force to the second handle or knob, determining that the second door is unlocked.

5. The mobile robot of claim 4, wherein the second threshold amount of force associated with the lock state of the second handle or knob of the second door is different from the threshold amount of force associated with the lock state of the handle or knob of the door.

6. The mobile robot of claim 4, wherein the controller is further configured to:
responsive to determining that the second door is unlocked, accessing a key of the second door; and
cause the rotatable ring to rotate relative to the robot body to enable the mechanical arm to lock the second door using the key.

7. The mobile robot of claim 4, wherein the controller is further configured to:
in response to determining that the second door is unlocked, send a request to a central system for a security personnel to lock the second door.

8. The mobile robot of claim 7, wherein the controller is further configured to:
cause the robot to wait within a threshold distance of the second door until the security personnel locks the second door.

9. The mobile robot of claim 8, wherein the controller is further configured to:
while waiting for a security personnel to lock the second door, identify an individual approaching the second door;
request the individual to present access control credentials; and
responsive to determining that the access control credentials do not meet one or more requirements for the door, cause the motorized base to move in front of the second door to prevent the individual from entering through the second door.

10. The mobile robot of claim 9, wherein the controller is further configured to:
send an update to the central system of an attempt from the individual to enter through the second door and a timestamp at which the attempt was made.

11. The mobile robot of claim 1, wherein the controller is further configured to:
responsive to the door opening upon the application of the force to the door in the direction associated with opening the door, determine that the door is unlatched; and
cause the mechanical arm to apply a second magnitude of force in a direction associated with closing the door.

12. The mobile robot of claim 1, wherein the controller is further configured to:
identify a location of an automatic door opening button;
rotate the rotatable ring based on a position of the automatic door opening button;
cause the mechanical arm to press the automatic door opening button; and
if the door does not open in response to pressing the automatic door opening button, determining that the door is locked.

13. A method comprising:
identifying a door to be tested;
causing a motorized base of a mobile robot to move to a location within a threshold distance from the identified door;
determining if the identified door is locked by:
rotating a rotatable ring of the mobile robot based on a position of a handle or knob of the door relative to the mobile robot;
causing the mechanical arm to apply a threshold amount of force to the handle or knob by applying an initial amount of force to the handle or knob and increasing the applied force in predetermined increments or gradually until the applied force is equal to the threshold amount of force, the threshold amount of force associated with a lock state of the handle; and
responsive to the door not opening upon the application of the threshold amount of force to the handle or knob, determining that the door is locked; and
responsive to determining that the identified door is locked, determining if the identified door is latched by:
determining a magnitude of force to apply to the door to check if the door is latched;
causing the mechanical arm to apply the magnitude of force in a direction associated with opening the door; and
responsive to the door not opening upon the application of the force to the door, determining that the door is latched.

14. The method of claim 13, further comprising:
responsive to determining that the door is locked, updating a status of the door in a semantic map to specify that the door is locked.

15. The method of claim 13, wherein the threshold amount of force associated with the lock state of the handle is retrieved from a semantic map.

16. The method of claim 13, further comprising:
identifying a second door to be tested;
causing the motorized base to move to a location within a threshold distance from the second door; and
determining if the second door is locked by:
rotating the rotatable ring based on a position of a second handle or knob of the second door relative to the mobile robot;
causing the mechanical arm to apply a second threshold amount of force to the second handle or knob, the second threshold amount of force associated with a lock state of the second handle or knob; and
responsive to the second door opening upon the application of the second threshold amount of force to the second handle or knob, determining that the second door is unlocked.

17. The method of claim 13, further comprising:
responsive to the door opening upon the application of the force to the door in the direction associated with opening the door, determining that the door is unlatched; and
causing the mechanical arm to apply a second magnitude of force in a direction associated with closing the door.

* * * * *